US008731888B2

(12) United States Patent
Yin et al.

(10) Patent No.: US 8,731,888 B2
(45) Date of Patent: May 20, 2014

(54) GAMMA RAY TOOL RESPONSE MODELING

(75) Inventors: Hezhu Yin, Humble, TX (US); Guo Pingjun, Bellaire, TX (US); JinJuan Zhou, Sugar Land, TX (US)

(73) Assignee: ExxonMobil Upstream Company, Houston, TX (US)

( * ) Notice: Subject to any disclaimer, the term of this patent is extended or adjusted under 35 U.S.C. 154(b) by 476 days.

(21) Appl. No.: 12/679,644

(22) PCT Filed: Nov. 14, 2008

(86) PCT No.: PCT/US2008/083600
§ 371 (c)(1),
(2), (4) Date: Mar. 23, 2010

(87) PCT Pub. No.: WO2009/079134
PCT Pub. Date: Jun. 25, 2009

(65) Prior Publication Data
US 2010/0204971 A1    Aug. 12, 2010

Related U.S. Application Data

(60) Provisional application No. 61/008,182, filed on Dec. 19, 2007.

(51) Int. Cl.
*G06G 7/48* (2006.01)
*G01V 5/04* (2006.01)
*G01V 5/00* (2006.01)
*G01V 5/06* (2006.01)
*G01V 11/00* (2006.01)
*E21B 49/00* (2006.01)

(52) U.S. Cl.
CPC ...... *G01V 5/06* (2013.01); *G01V 11/00* (2013.01); *E21B 49/00* (2013.01)
USPC .......... 703/10; 250/261; 250/250; 250/253; 250/259; 702/8; 703/7

(58) Field of Classification Search
CPC .......... G01V 5/06; G01V 11/00; E21B 49/00
USPC .......... 703/7, 10; 702/8; 250/253, 261, 259
See application file for complete search history.

(56) References Cited

U.S. PATENT DOCUMENTS 4,710,906 A * 12/1987 Bradley et al. ............ 175/40
4,817,059 A * 3/1989 Hornby et al. ............ 367/28
(Continued)

FOREIGN PATENT DOCUMENTS

EP         1 885 996      4/2009
WO    WO 2009/055152     4/2009
(Continued)

OTHER PUBLICATIONS

A Hybrid Solution for Fast 3D Gamma Ray Tool Modeling in High Angle and Horizontal Wells Hezhu Yin et al; SPWLA 49th Annual Logging Symposium, May 25-28, 2008; pp. 1-12.*

(Continued)

*Primary Examiner* — Akash Saxena
(74) *Attorney, Agent, or Firm* — ExxonMobil Upstream Research Company Law Dept.

(57) ABSTRACT

Systems and methods which provide modeling or simulation of gamma ray (GR) tool response using a hybrid analytical and numerical technique are shown. Embodiments employ a GR tool simulation technique which provides gamma ray information simulated as a function of only the gamma particles which reach the detector without scattering. Embodiments utilize a discretization function to determine the gamma particles which would reach a point detector from each unit volume source of an investigation domain without scattering. Embodiments further utilize the foregoing discretization function with respect to a plurality of point detectors, wherein the particular number and configuration of point detectors are selected to relatively accurately simulate the results of a particular GR detector configuration, such as line detector or volume detector configurations. Embodiments may be implemented using inexpensive and widely available computing platforms, such as personal computers, thereby facilitating economic and practical GR tool simulation.

28 Claims, 13 Drawing Sheets

(56) References Cited

U.S. PATENT DOCUMENTS

| | | | |
|---|---|---|---|
| 4,916,616 A * | 4/1990 | Freedman et al. | 702/13 |
| 4,931,638 A * | 6/1990 | Chernyak et al. | 250/253 |
| 5,081,611 A * | 1/1992 | Hornby | 367/25 |
| 5,334,833 A * | 8/1994 | Case et al. | 250/269.1 |
| 5,536,938 A * | 7/1996 | Mills et al. | 250/269.4 |
| 5,995,906 A | 11/1999 | Doyen et al. | |
| 6,078,867 A * | 6/2000 | Plumb et al. | 702/6 |
| 6,173,606 B1 | 1/2001 | Mosley | |
| 6,215,120 B1 * | 4/2001 | Gadeken et al. | 250/256 |
| 6,289,283 B1 * | 9/2001 | Plasek | 702/8 |
| 6,476,609 B1 * | 11/2002 | Bittar | 324/338 |
| 6,675,101 B1 | 1/2004 | Shray et al. | |
| 6,766,254 B1 | 7/2004 | Bradford et al. | |
| 6,781,115 B2 * | 8/2004 | Stoller et al. | 250/266 |
| 6,885,942 B2 | 4/2005 | Shray et al. | |
| 6,925,384 B2 | 8/2005 | Frenkel et al. | |
| 7,000,700 B2 * | 2/2006 | Cairns et al. | 166/255.2 |
| 7,032,661 B2 | 4/2006 | Georgi et al. | |
| 7,076,370 B1 | 7/2006 | Freedman et al. | |
| 7,093,672 B2 * | 8/2006 | Seydoux et al. | 175/24 |
| 7,114,565 B2 * | 10/2006 | Estes et al. | 166/255.2 |
| 7,253,402 B2 * | 8/2007 | Gilchrist et al. | 250/269.7 |
| 7,254,486 B2 * | 8/2007 | Guo | 702/8 |
| 7,277,796 B2 | 10/2007 | Kuchuk et al. | |
| 7,292,942 B2 | 11/2007 | Ellis et al. | |
| 7,294,829 B2 | 11/2007 | Gilchrist | |
| 7,356,413 B2 | 4/2008 | Georgi et al. | |
| 7,380,598 B2 | 6/2008 | Wydrinski et al. | |
| 7,432,500 B2 * | 10/2008 | Sale | 250/256 |
| 7,523,002 B2 | 4/2009 | Griffiths | |
| 7,558,675 B2 * | 7/2009 | Sugiura | 702/9 |
| 7,649,169 B2 * | 1/2010 | Guo | 250/261 |
| 7,775,274 B2 | 8/2010 | Wydrinski et al. | |
| 7,818,128 B2 * | 10/2010 | Zhou et al. | 702/8 |
| 7,933,718 B2 * | 4/2011 | McDaniel et al. | 702/11 |
| 8,050,866 B2 * | 11/2011 | Jacobson | 702/8 |
| 8,157,008 B2 | 4/2012 | Lilley | |
| 8,201,625 B2 | 6/2012 | Almaguer | |
| 2002/0120429 A1 | 8/2002 | Ortoleva | |
| 2004/0154831 A1 * | 8/2004 | Seydoux et al. | 175/24 |
| 2006/0074561 A1 | 4/2006 | Xia et al. | |
| 2006/0131496 A1 * | 6/2006 | Fitzgerald | 250/253 |
| 2006/0208184 A1 * | 9/2006 | Guo | 250/253 |
| 2006/0229815 A1 * | 10/2006 | Guo | 702/8 |
| 2007/0290127 A1 * | 12/2007 | Riley et al. | 250/265 |
| 2008/0061225 A1 | 3/2008 | Orban et al. | |
| 2009/0012710 A1 | 1/2009 | Van Os et al. | |
| 2009/0043510 A1 | 2/2009 | Allen et al. | |
| 2009/0145600 A1 * | 6/2009 | Wu et al. | 166/250.02 |
| 2010/0204971 A1 * | 8/2010 | Yin et al. | 703/6 |
| 2010/0252724 A1 * | 10/2010 | Inanc et al. | 250/254 |
| 2011/0029246 A1 * | 2/2011 | Nikitin et al. | 702/8 |
| 2011/0049345 A1 * | 3/2011 | Roberts | 250/269.6 |
| 2011/0191030 A1 * | 8/2011 | Roberts | 702/8 |
| 2011/0240302 A1 | 10/2011 | Coludrovich, III | |
| 2011/0253364 A1 | 10/2011 | Mosse et al. | |
| 2011/0290011 A1 | 12/2011 | Dowla et al. | |
| 2012/0010819 A1 * | 1/2012 | Ansari et al. | 702/8 |
| 2012/0075953 A1 | 3/2012 | Chase et al. | |
| 2012/0197529 A1 * | 8/2012 | Stephenson et al. | 702/8 |

FOREIGN PATENT DOCUMENTS

| | | |
|---|---|---|
| WO | WO 2011/126667 | 10/2011 |
| WO | WO 2011/127156 | 10/2011 |
| WO | WO 2011/152924 | 12/2011 |
| WO | WO 2012/036689 | 3/2012 |

OTHER PUBLICATIONS

Ellis, D.V., Gamma Ray Devices, 1987, Well Logging for Earth Scientists, Elsevier Science Publishing Co., Inc., pp. 181-200.

Allen, D. (1995), "Modeling Logs for Horizontal Well Planning and Evaluation," *Oilfield Review*, pp. 47-63.

* cited by examiner

GAMMA RAY TOOL RESPONSE MODELING

CROSS-REFERENCE TO RELATED APPLICATION

This application is the National Stage entry under 35 U.S.C. 371 of PCT/US2008/083600 that published as WO2009/079134 and was filed on 14 Nov. 2008, which claims the benefit of U.S. Provisional Patent Application 61/008,182 filed Dec. 19, 2007 entitled GAMMA RAY TOOL RESPONSE MODELING, each of which is incorporated by reference, in its entirety, for all purposes.

TECHNICAL FIELD

The invention relates generally to gamma ray tool response and, more particularly, to gamma ray tool response modeling or simulation.

BACKGROUND OF THE INVENTION

Gamma ray (GR) detectors have been widely used to collect information during geological exploration, hydrocarbon drilling operations, etc. For example, GR detectors are commonly used to passively collect gamma ray radiation in the environment in which the GR detectors are disposed. Various geological media, such as shale, provides a natural source of gamma ray energy, whereas other geological media, such as sand, provides very little gamma ray energy. Accordingly, a GR detector is useful in obtaining information regarding the geological media and structure.

GR tools employing the aforementioned GR detectors have been commonly employed to create well logs useful in analyzing geological structures penetrated by hydrocarbon drilling operations. Such GR tools have comprised wireline tool configurations, which require removal of the drill string from the borehole in order to introduce the tool into the well. More recently, such GR tools have comprised logging while drilling (LWD) tool configurations, wherein the GR tool is included in the drill string and provides a GR detector disposed upon the circumference of the drill string assembly (i.e., eccentric from the drill string center of rotation). The foregoing GR tools comprise a passive GR detector, such as may be comprised of a scintillation detector, providing frequency and amplitude information corresponding to the gamma rays impinging thereon. Accordingly, by collecting gamma ray information, using the aforementioned GR tools, information regarding the geological structure, such as depth, thickness, and type of sediment beds, may be obtained. That is, gamma ray signatures associated with various media may be analyzed to determine the characteristics of a geological formation being explored.

Although GR logs acquired using the foregoing GR tools can reveal sedimentary structure of formations penetrated by the borehole, the information provided by such GR tools is not robust. Accordingly, where a vertical well penetrates horizontal structure, the GR logs may be relatively straight forward to interpret, such as by determining the measured depths (MDs) at which particular gamma ray signatures are experienced. However, where there is a high dip angle between the borehole and structure feature, such as sediment bed boundary, as is often experienced in high angle and horizontal (HA/HZ) wells, the information provided by GR logs becomes very difficult to analyze. Moreover, the eccentricity associated with the GR detector being disposed on the circumference of the drill stem further obscures the proper analysis of GR log information provided by LWD tools. For example, it has been discovered that a single sediment bed boundary penetrated by a borehole at a high dip angle (e.g., 80°) using a LWD GR tool provides a double peaked GR detector amplitude response. Such a response, without more information appears to represent more than one sediment bed boundary, none of which appear to be at the actual measured depth of the actual sediment bed boundary penetrated. As HA/HZ wells, and other situations where high dip angles are experienced, are becoming more common, the usefulness of GR logs is decreasing.

Efforts have been made to provide modeling or simulation of GR tool response in order to better interpret GR logs. For example, computer code providing Monte-Carlo for N particles (MCNP) simulation, developed by Los Alamos National Laboratory, has been used to simulate GR tool response. Unfortunately, such MCNP simulation requires substantial computing power and time. For example, simulation of GR tool response for a relatively simple formation often requires days of computing time on a multi-processor supercomputer. Moreover, a nuclear physicist, or other person with very advanced training, is required to properly implement the MCNP simulation. Accordingly, such simulation has been cost and time prohibitive for widespread use.

SUMMARY

The present invention is directed to systems and methods which provide modeling or simulation of GR tool response using a hybrid analytical and numerical technique to provide sufficiently accurate simulation results using relatively little computing power and/or time. GR tool simulation provided according to embodiments of the invention provides three-dimensional (3D) GR tool response modeling.

Embodiments of the invention employ a GR tool simulation technique which provides gamma ray information simulated as a function of only the gamma particles which would reach the detector without scattering (i.e., direct propagation from gamma ray source to GR tool detector). The foregoing affects the ability for direct comparison of the simulation with GR logs produced in the field. Accordingly, embodiments of the invention operate to scale simulation results to American Petroleum Institute (API) units, or normalized to volume of shale (Vsh). Such scaled simulation results provide simulated GR log results which may be directly compared to GR logs produced in the field. Through such a comparison, it may be determined that sufficient correlation is present to indicate that the geological structure of the simulation represents the geological structure present in the well where the GR logs produced in the field were collected.

In providing a GR tool simulation technique wherein only gamma particles which would reach the detector without scattering are considered, embodiments of the present invention assume a uniformly distributed gamma ray source in space. The gamma ray source may then be discretized as a plurality of unit volume sources. Accordingly, embodiments of the invention utilize a discretization function to determine the gamma particles which would reach a point detector from each such unit volume source without scattering. However, as many GR detectors implemented by typical GR tools are not point detectors (e.g., volume detectors), embodiments of the present invention further utilize the foregoing discretization function with respect to a plurality of point detectors, wherein the particular number and configuration of point detectors are selected to relatively accurately simulate the results of a particular GR detector configuration. For example, embodiments of the present invention utilize a linear multiple point detector configuration in simulating a volume GR detector configuration.

As can be appreciated from the foregoing, GR tool response modeling provided according to embodiments of the invention facilitates a practical and relatively fast simulation, such as may be used as an aid in GR log interpretation. Experimentation has revealed that GR tool simulation provided according to embodiments of the present invention may be performed at computing speeds over 1000 times faster than those associated with MCNP based simulation techniques. Thus, embodiments may be implemented using inexpensive and widely available computing platforms, such as personal computers, thereby facilitating economic and practical GR tool simulation.

For example, in one general aspect, a method includes representing an investigation domain using a plurality of discrete radiation source volumes, the investigation domain comprising at least one layer of a geological structure; and modeling a gamma ray (GR) tool response by determining a count of gamma ray particles emitted by each the radiation source volume of the plurality of discrete radiation source volumes which would impinge upon a point GR detector without scattering in the propagation path between an emitting one of the radiation source volumes and the point GR detector, the gamma ray particles impinging upon the point GR detector without scattering being zero-scatter gamma ray particles.

Implementations of this aspect may include one or more of the following features. For example, the plurality of discrete radiation source volumes may each be the same volume. The plurality of discrete radiation source volumes may include smaller volumes near in areas near the GR detector and larger volumes at an outer edge of the investigation domain. The plurality of discrete radiation source volumes may include an exponentially varying grid of radiation source volumes. The plurality of discrete radiation source volumes may be disposed in at least one plane paralleling a boundary plane of the at least one layer of the geological structure. The modeling of the GR tool response may include representing a GR detector of the GR tool as a plurality of point GR detectors, the point GR detector being one of the plurality of point GR detectors. The plurality of point GR detectors may be arranged to be on an eccentric with respect to a borehole center. The modeling of the GR tool response may include determining a count of zero-scatter gamma ray particles emitted by each the radiation source volume of the plurality of discrete radiation source volumes which would impinge upon each point GR detector of the plurality of point GR detectors. The GR detector may include a line detector and the plurality of point GR detectors may include a plurality of point detectors arranged to be evenly spaced along a line of a length of the line detector.

The GR detector may include a volume detector and the plurality of point GR detectors may include a plurality of point detectors arranged to be evenly spaced along a line of a length of the volume detector. The plurality of point GR detectors may include a single line of the point detectors. The determining of a count of gamma ray particles which would impinge upon the point GR detector without scattering may include applying a discretization function with respect to the plurality of discrete radiation source volumes and the point GR detector.

According to another general aspect, a method includes representing an area of geologic investigation as a plurality of radiation source volumes, the area of geologic investigation comprising at least one layer of a geological structure; representing a GR detector of a GR tool as a plurality of point GR detectors; and determining a count of gamma ray particles emitted by each the radiation source volume of the plurality of discrete radiation source volumes which would impinge upon each point GR detector of the plurality of point GR detectors.

Implementations of this aspect may include one or more of the following features. For example, the plurality of discrete radiation source volumes may each be a same size volume. The plurality of discrete radiation source volumes may include different size volumes. The plurality of radiation source volumes may be disposed in at least one plane paralleling a boundary plane of the at least one layer of the geological structure. The determining of a count of gamma ray particles may include counting only zero-scatter gamma ray particles emitted by each the radiation source volume of the plurality of discrete radiation source volumes which would impinge upon each point GR detector of the plurality of point GR detectors. The GR detector may include a line detector and the plurality of point GR detectors comprise a plurality of point detectors arranged to be evenly spaced along a line of a length of the line detector. The GR detector may include a volume detector and the plurality of point GR detectors comprise a plurality of point detectors arranged to be evenly spaced along a single line of a length of the volume detector.

According to another general aspect, a method includes determining counts of gamma ray particles which would impinge upon a point gamma ray (GR) detector without scattering in the gamma ray propagation path, the gamma ray particles impinging upon the point GR detector without scattering being zero-scatter gamma ray particles; and modeling a GR tool response for a plurality of borehole azimuth angles using the counts of gamma ray particles.

Implementations of this aspect may include one or more of the following features. For example, an investigation domain may be represented using a plurality of discrete radiation source volumes, the investigation domain may include at least one layer of a geological structure, wherein the determining counts may include determining counts of gamma ray particles emitted by each radiation source volume of the plurality of discrete radiation source volumes which would impinge upon the point GR detector without scattering in the propagation path between an emitting one of the radiation source volumes and the point GR detector.

According to another general aspect, a computer program product having computer executable code stored on a computer readable medium, the computer program product may include computer executable code for representing an investigation domain as a plurality of radiation source volumes; and computer executable code for modeling a gamma ray (GR) tool response by determining a count of gamma ray particles emitted by each the radiation source volume of the plurality of radiation source volumes which would impinge upon a point GR detector without scattering in the propagation path between an emitting one of the radiation source volumes and the point GR detector.

Implementations of this aspect may include one or more of the following features. For example, the computer program product may include computer executable code for representing a GR detector of the GR tool as a plurality of point GR detectors, the point GR detector being one of the plurality of point GR detectors.

According to another general aspect, a system includes one or more hardware and/or software components configured for representing an area of geologic investigation as a plurality of discrete radiation source volumes; for representing a GR detector of a GR tool as a plurality of point GR detectors; for determining a count of gamma ray particles emitted by each the radiation source volume of the plurality of discrete radiation source volumes which would strike each point GR detector of the plurality of point GR detectors; and/or for modeling a GR tool response using the count of gamma ray particles associated with each the point GR detector of the plurality of point GR detectors. The system may also include the recited GR tool.

Implementations of one or more of the aforementioned aspects may include one or more of the following features. For example, any one of the aforementioned methods may include positioning a GR tool within a borehole within a subsurface formation. Based on the modeled GR tool response, structural characteristics of a geological formation within the subsurface formation may be determined. The determined structural characteristics of the geological formation may be analyzed to determine, e.g., create, a hydrocarbon production plan. Hydrocarbons may be produced from the subsurface formation based on the hydrocarbon production plan.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE INVENTION

Figure 1:
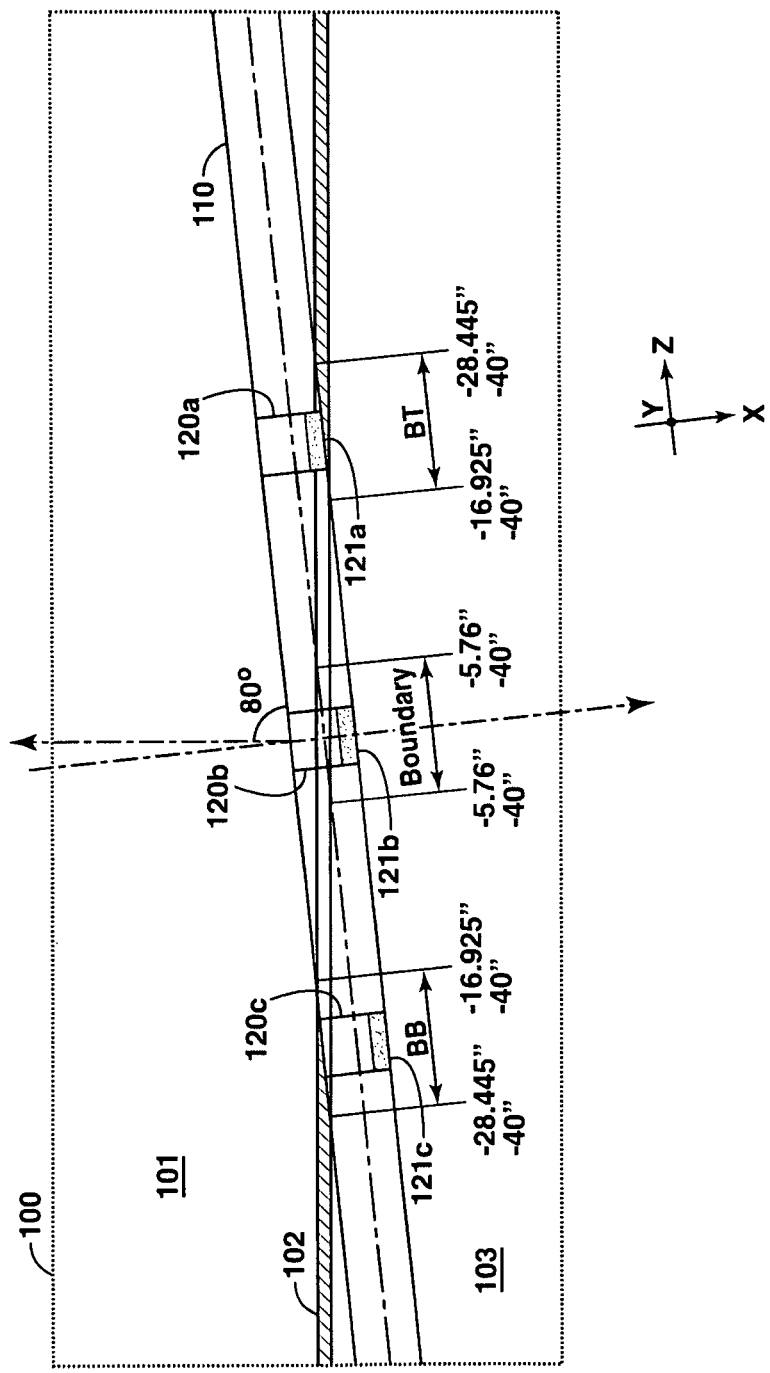
FIG. 1 shows an exemplary well having a GR tool disposed therein, as may be modeled according to embodiments of the invention.

Directing attention to FIG. 1, an exemplary well is illustrated wherein the borehole penetrates formation structure at a high dip angle. Specifically, geological structure 100, which includes shale layer 102 (e.g., a 2 inch thick layer of shale) surrounded by other geological media (e.g., sand, soil, etc.) of layers 101 and 103, penetrated by borehole 110 (e.g., an 8 inch diameter borehole). In the illustrated embodiment, borehole 110 comprises a high angle or horizontal (HA/HZ) well configuration, wherein shale layer 102 is penetrated at an 80° dip angle.

Gamma ray (GR) tool 120 (shown as GR tool 120a-120c as disposed in the various positions of FIG. 1), having GR detector 121 disposed therein, is introduced into borehole 110 to collect gamma rays emitted by media of formation 100. For example, GR tool 120 may comprise a logging while drilling (LWD) tool configuration wherein GR tool 120 comprises a part of the drill string (not shown) used to create borehole 110. Regardless of whether GR tool 120 comprises a LWD configuration or a wireline configuration, GR tool 120 is moved down through borehole 110 so as to collect gamma ray information at various measured depths. GR tool 120a-120c, and correspondingly GR detector 121a-121c, represent GR tool 120 disposed at different measured depths. In LWD operation, GR tool 120 would be rotated within borehole 110, thereby providing a 360° view of the borehole wall to GR detector 121 disposed on the circumference of GR tool 120.

Figure 2:
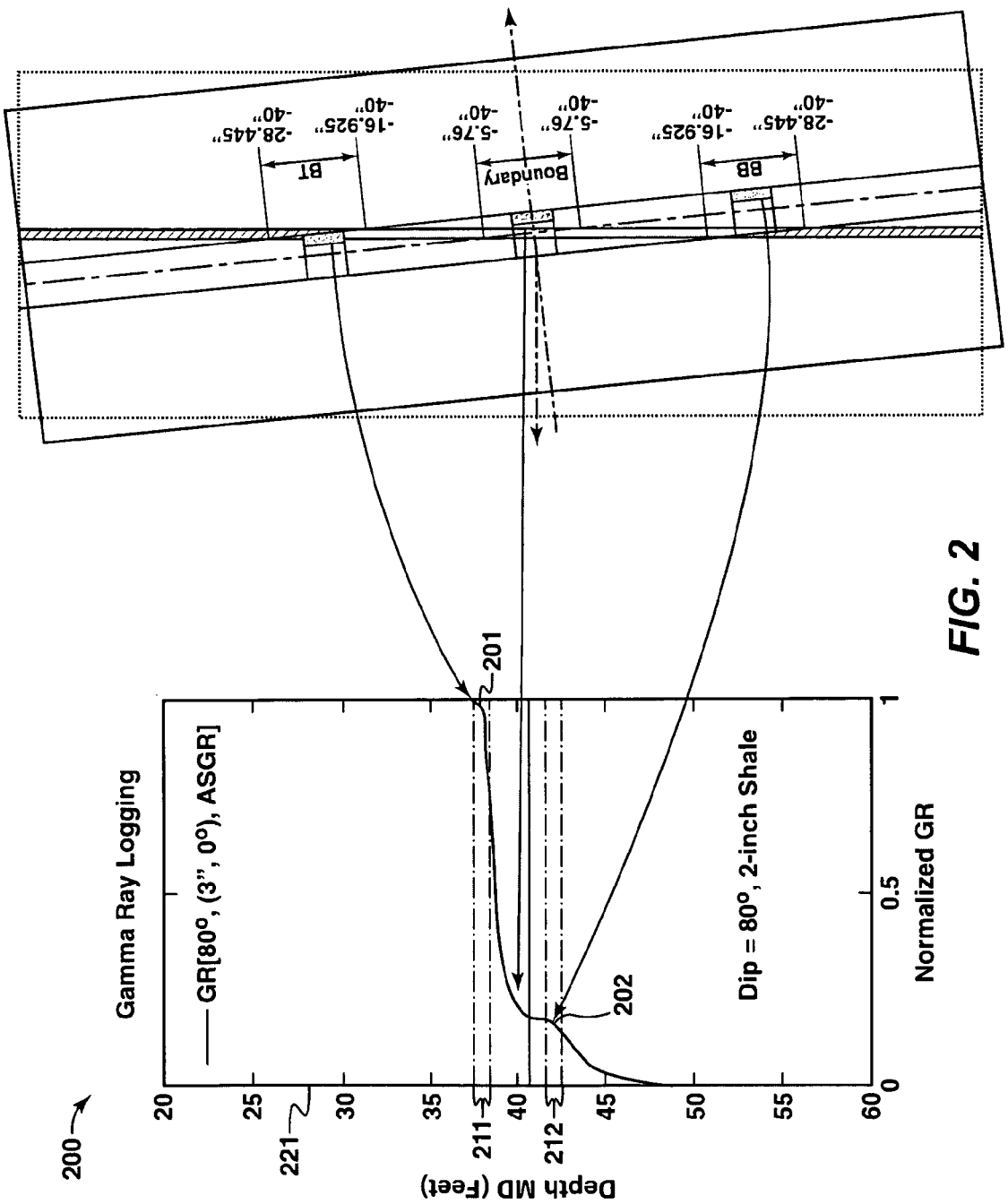
FIG. 2 shows a GR log providing the GR tool response from the well of FIG. 1.

Although geological structure 100 of the illustrated embodiment provides a relatively simple structure, GR logs produced using GR tool 120 are likely to be difficult to analyze due at least in part to the high dip angle between borehole 110 and shale layer 102. As can be seen in FIG. 1, borehole 110 penetrates shale layer 102 in the area designated "BT" (boundary top) and exits shale layer 102 in the area designated "BB" (boundary bottom). However, the midpoint of shale layer 102, falling in the area designated "boundary," would typically be desirable to identify for the geological structure analysis. Directing attention to FIG. 2, it can be seen that GR log 200 produced using GR tool 120 has peaks associated with the borehole penetration of the shale layer (peak 201 corresponding to area BT) and the borehole exiting the shale layer (peak 202 corresponding to area BB). Typical analysis of GR log 200 may result in the conclusion that a shale layer is disposed at area 211 (e.g., a measured depth of approximately 38 feet) and another shale layer is disposed at area 212 (e.g., a measured depth of approximately 42 feet), when actually there is only one shale layer disposed at area 221 (e.g., a measured depth of approximately 40 feet).

As can be appreciated by the foregoing, simulation or modeling of GR tool response with respect to various geological structures is highly valuable in analyzing and understanding GR logs. Although computer code providing Monte-Carlo for N particles (MCNP) simulation, developed by Los Alamos National Laboratory, has been used to accurately simulate GR tool response, such MCNP simulation requires substantial computing power and time. Accordingly, embodiments of the present invention provide modeling or simulation of GR tool response using a hybrid analytical and numerical technique to provide sufficiently accurate simulation results using relatively little computing power and/or time.

Embodiments of the invention employ a GR tool simulation technique which provides gamma ray information simulated as a function of only the gamma particles which would reach the detector without scattering (i.e., direct propagation from gamma ray source to GR tool detector). Embodiments of the invention operate to scale simulation results to American Petroleum Institute (API) units, or normalized to volume of shale (Vsh), to facilitate comparison of modeled or simulated results with actual GR log information.

In providing an analytical expression for GR tool response according to embodiments of the invention, gamma ray intensity, dJ, detected at a point detector from a source of unit volume dv at distance R may be represented as:

$$dJ_r = n_r dv \cdot \frac{e^{-\mu R}}{4\pi R^2} \tag{1}$$

Wherein, it is assumed that the absorption attenuation of gamma rays is $\mu$ along the radiation direction, the source volume dv emits $n_r$ dv gamma ray particles per second, and the gamma ray particles reach the detector without scattering (i.e., zero scattering).

Using equation (1) above, if it is assumed that the gamma ray source is uniformly distributed in space, the gamma ray intensity at a point detector may be expressed as a volumetric integral over the entire space of the volume of the investigation as set forth below:

$$J_r = \int_v n_\gamma \frac{e^{-\mu R}}{4\pi R^2} \cdot dv \tag{2}$$

In deriving an analytical expression for a GR tool response, the case of a deviated well traversing through a single layer formation (e.g., as represented by shale layer 102 of FIG. 1) will first be considered. Using both cylindrical and Cartesian coordinates in the analysis, the Z axis is located in the center of the borehole, and the $\rho$-$\phi$ and X-Y planes are perpendicular to the borehole. It is assumed that the deviation angle of the well (or relative dip of the formation) is $\theta$, and thus the plane parallel to the formation (e.g., parallel to the sediment bed boundary) has the same angle $\theta$ to the $\rho$-$\phi$ and X-Y planes. It is further assumed that the whole formation is the source, except for the borehole and the casing, and that the source is bounded by the integral of the planes parallel to the formation. A plane parallel to the formation may be expressed as:

$$\hat{n} = (-\sin\theta, 0, \cos\theta) \tag{3}$$

$$\underline{PP'} = (\rho_s \cdot \cos\phi_s, \rho_s \cdot \sin\phi_s, Z_s - Z_{s0}) \tag{4}$$

Using equations (1)-(4) above, $Z_S$ (the point at which a plane including the source and which is parallel to the formation intersects the Z axis) can be solved as:

$$Z_s = Z_{s0} + \rho_s \cdot \cos\phi_s \cdot tg\theta \tag{5}$$

From the above, the whole volume of the source as may provide gamma ray energy impinging upon the GR detector (i.e., the volume within the investigation domain) can be expressed as:

$$V = \int_c^{\rho_{s\_max}} d\rho_s \int_0^{2\pi} \rho d\phi_s \int_{z1+\rho_s \cdot \cos\phi_s \cdot tg\theta}^{z2+\rho_s \cdot \cos\phi_s \cdot tg\theta} dZ_s \tag{6}$$

$$= \int_{\rho_c}^{\rho_{s\_max}} \int_0^{2\pi} \int_{z1+\rho_s \cdot \cos\phi_s \cdot tg\theta}^{z2+\rho_s \cdot \cos\phi_s \cdot tg\theta} \rho_s d\rho_s d\phi_s dZ_s$$

where $\rho_b$ is the radius of the borehole, $\rho_c$ is the radius of the casing, $\rho_{s\_max}$ is the maximum radius of the source affecting the GR detector, z1 is the top of the source along the Z axis, and z2 is the bottom of the source along the Z axis.

Figure 3:
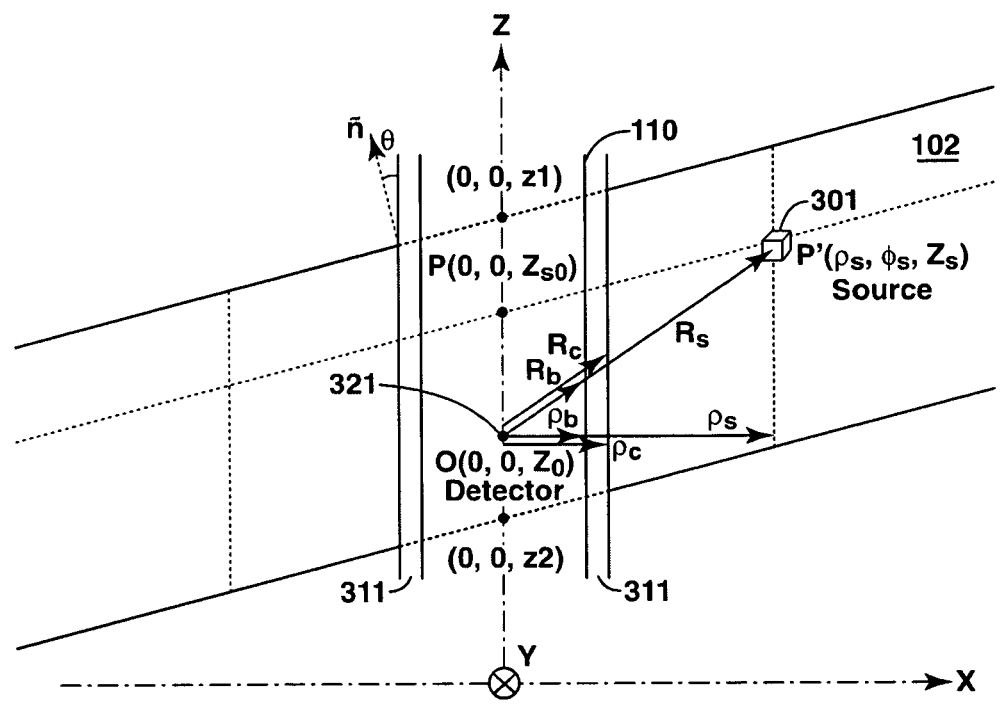
FIG. 3 shows the geometric relationship of a point GR detector and a unit volume source.

Directing attention to FIG. 3, the geometric relationship of a point detector and unit volume source is shown. Specifically, point detector 321 of the illustrated embodiment is disposed at point O(0, 0, $Z_0$), which is at the center of the borehole 110, and unit volume sources (source 301 being shown) are disposed at points P'($\rho_s$,$\phi_s$,$Z_s$) within shale layer 102. It should be appreciated that in the embodiment illustrated in FIG. 3, casing 311 lining borehole 110 has been included.

From the foregoing, the gamma ray intensity received by point detector 321 at point O from a source with unit volume dv at any arbitrary point P' may be expressed as:

$$dJ_\gamma = \frac{n_\lambda dv}{4\pi R_s^2} \cdot e^{-\mu_b R_b - \mu_c(R_C - R_b) - \mu(R_s - R_c)} \tag{7}$$

Using the geometric relationships illustrated in FIG. 3, it can be appreciated that:

$$\frac{R_b}{\rho_b} = \frac{R_c}{\rho_c} = \frac{R_s}{\rho_s} = \frac{\sqrt{\rho_s^2 + (Z_s - Z_0)^2}}{\rho_s} = \sqrt{1 + \left(\frac{Z_s - Z_0}{\rho_s}\right)^2} \tag{8}$$

Thus:

$$R_b = \rho_b \cdot \sqrt{1 + \left(\frac{Z_s - Z_0}{\rho_s}\right)^2}, \tag{9}$$

$$R_c = \rho_c \cdot \sqrt{1 + \left(\frac{Z_s - Z_0}{\rho_s}\right)^2}, R_s = \rho \cdot \sqrt{1 + \left(\frac{Z_s - Z_0}{\rho_s}\right)^2}$$

By combining equations (7) and (9), the mathematical expression for the gamma ray radiation from the formation may be represented as:

$$dJ_r = \frac{n_\lambda dv}{4\pi[\rho_s^2 + (Z_s - Z_0)^2]} \cdot e^{\begin{bmatrix}-\mu_b\rho_b - \mu_c(\rho_c - \rho_b)\\ -\mu(\rho_s - \rho_c)\end{bmatrix}} \cdot \sqrt{1 + \left(\frac{Z_s - Z_0}{\rho_s}\right)^2} \quad (10)$$

$$= n_\lambda \cdot \frac{e^{[-\mu_b\rho_b - \mu_c(\rho_c - \rho_b) - \mu(\rho_s - \rho_c)]} \cdot \sqrt{1 + \left(\frac{Z_s - Z_0}{\rho_s}\right)^2}}{4\pi[\rho_s^2 + (Z_s - Z_0)^2]} \cdot dv$$

Taking the source part as represented in equations (6) and (10), the whole space integral for the three-dimensional (3D) GR point detector response can be expressed as:

$$J_r = \iiint_V dJ_r \quad (11)$$

By performing integration for all unit volume sources within the investigation domain using cylindrical coordinates, the gamma ray intensity at the point detector may be represented as:

$$J_\gamma = n_\lambda \cdot \int_{\rho_c}^{\rho_{s\_max}} \int_0^{2\pi} \int_{z1+\rho_s\cdot\cos\phi_s\cdot tg\phi}^{z2+\rho_s\cdot\cos\phi_s\cdot tg\phi} \quad (12)$$

$$\frac{e^{[-\mu_b\rho_b - \mu_c(\rho_c - \rho_b) - \mu(\rho_s - \rho_c)] \cdot \sqrt{1 + \left(\frac{Z_s - Z_0}{\rho_s}\right)^2}}}{4\pi[\rho_s^2 + (Z_s - Z_0)^2]} \cdot$$

$$\rho_s d\rho_s d\phi_s dZ_s$$

Where:

$$Z_{s0} = Z_s - \rho_s \cdot \cos\phi_s \cdot tg\theta \quad (13)$$

then:

$$dZ_{s0} = dZ_s \quad (14)$$

$$Z_s = Z_{s0} + \rho_s \cdot \cos\phi_s \cdot tg\theta \quad (15)$$

$$Z_s = Z2 + \rho_s \cdot \cos\phi_s \cdot tg\theta \rightarrow Z_{s0} = Z2 \quad (16)$$

$$Z_s = Z1 + \rho_s \cdot \cos\phi_s \cdot tg\theta \rightarrow Z_{s0} = Z1 \quad (17)$$

From the above, the analytical expression for 3D centered GR point detector response in a deviated borehole or formation with dip can be expressed as:

$$J_\gamma = n_\lambda \cdot \int_{\rho_c}^{\rho_{s\_max}} \int_0^{2\pi} \int_{z1}^{z2} \frac{e^{[-\mu_b\rho_b - \mu_c(\rho_c - \rho_b) - \mu(\rho_s - \rho_c)]} \cdot \sqrt{1 + \left(\frac{Z_{s0} + \rho_s \cdot \cos\phi_s \cdot tg\phi - Z_0}{\rho_s}\right)^2}}{4\pi[\rho_s^2 + (Z_{s0} + \rho_s \cdot \cos\phi_s \cdot tg\phi - Z_0)^2]} \cdot \quad (18)$$

$$\rho_s d\rho_s d\phi_s dZ_{s0}$$

Figure 4:
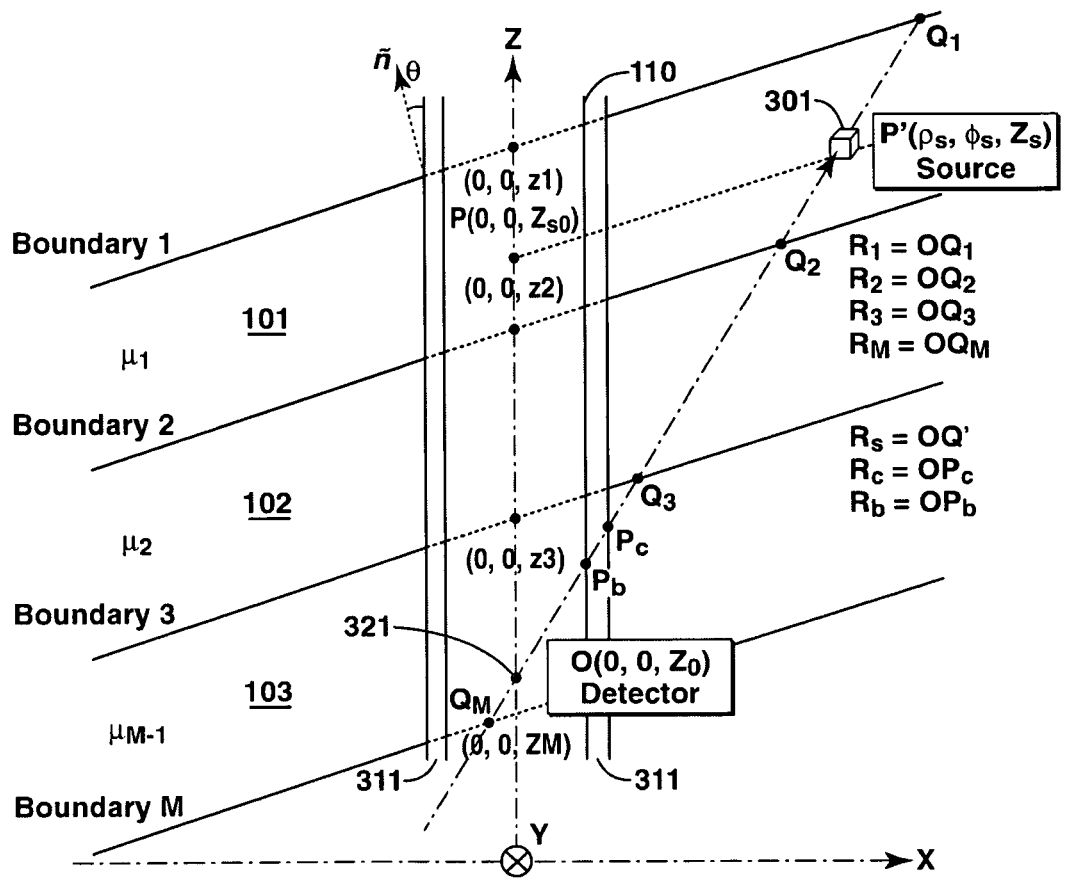
FIG. 4 shows the geometric relationship of a point GR detector and a unit volume source in a multiple layer formation.

Directing attention to FIG. 4, the geometric relationship of point detector 321 and source 301 in a multiple layer formation is shown. Similar to the single layer formation case as set forth in equation (7) above, the gamma ray intensity received by point detector 321 disposed at point O from source 301, having unit volume dv, disposed at any arbitrary point P' in a multiple layer formation can be expressed as:

$$dJ_\gamma = \frac{n_\lambda dv}{4\pi R_s^2} \cdot e^{-\mu_1(R_s - R_2) - \mu_2(R_2 - R_3) - \mu_3(R_3 - R_c) - \mu(R_c - R_b) - \mu_b R_b} \quad (19)$$

where:

$$\frac{Z_1 - Z_0}{Z_{s0} - Z_0} = \frac{R_1}{R_s} \Rightarrow R_1 = \frac{Z_1 - Z_0}{Z_{s0} - Z_0} \cdot R_s \quad (20)$$

$$\frac{Z_2 - Z_0}{Z_{s0} - Z_0} = \frac{R_2}{R_s} \Rightarrow R_2 = \frac{Z_2 - Z_0}{Z_{s0} - Z_0} \cdot R_s \quad (21)$$

$$\frac{Z_m - Z_0}{Z_{s0} - Z_0} = \frac{R_m}{R_s} \Rightarrow R_m = \frac{Z_m - Z_0}{Z_{s0} - Z_0} \cdot R_s \quad (22)$$

and where $R_m$ is the distance from the detector to the point $Q_m$, which is the intersection of boundary M and the gamma ray radiation path. As can be seen in FIG. 4, the geometric relationships with respect to $R_b/\rho_b$, $R_c/\rho_c$, and $R_s/\rho_s$ remain the same in the multiple layer formation case. Thus, combining equations (7) and (20) provides a mathematical expression of the gamma ray radiation from the multiple layer formation. The analytical expression for 3D centered GR point detector response in a deviated borehole or formation with dip in a multiple layer formation can thus be derived using equation (19) as shown for the single layer formation case.

The foregoing exemplary cases have assumed that the GR detector (as represented by point detector 321) is disposed in the center of the borehole, such as in the case of a wireline GR tool configuration. However, some GR tool configurations do not dispose the GR detector in the center of the borehole. For example, LWD GR tool configurations dispose the GR detector on the circumference of the tool, thereby placing the GR detector on an eccentric with respect to the borehole center. Such tool configurations further complicate GR tool response modeling. Accordingly, embodiments of the invention are adapted to model such GR tool configurations.

Figure 5:
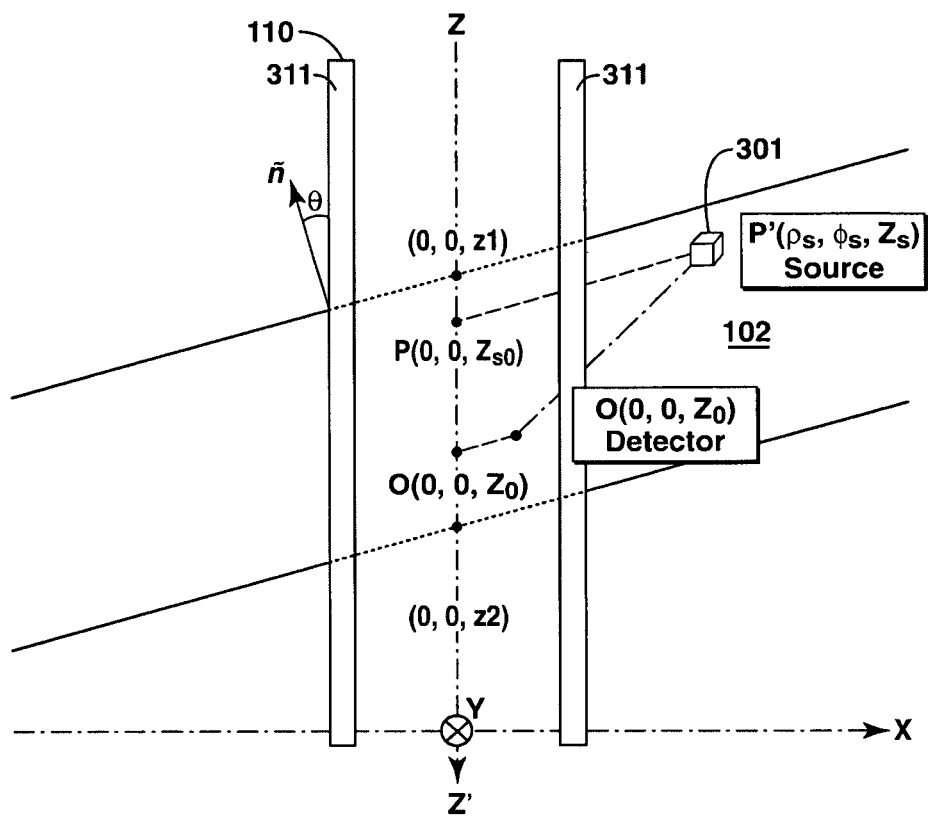
FIGS. 5 and 6 show the geometric relationship of a point GR detector, disposed on an eccentric with respect to the borehole, and a unit volume source.

Directing attention to FIG. 5, the geometric relationship of a unit volume source and a point detector disposed on an eccentric with respect to the center of the borehole is shown. Specifically, point detector 521 of the illustrated embodiment is disposed at point $O_e(\rho_e,\phi_e,Z_e)$, which is more near the wall of borehole 110, and unit volume sources (source 301 being shown) are disposed at points P'($\rho_s,\phi_s,Z_s$) within shale layer 102. Compared with the centered detector cases shown above, there is a difference in the distance of the gamma ray path inside the different mediums, including the distances inside borehole $R_b$, the distance inside casing $R_c$, and the distances inside the layers, in the example illustrated in FIG. 5.

Figure 6:
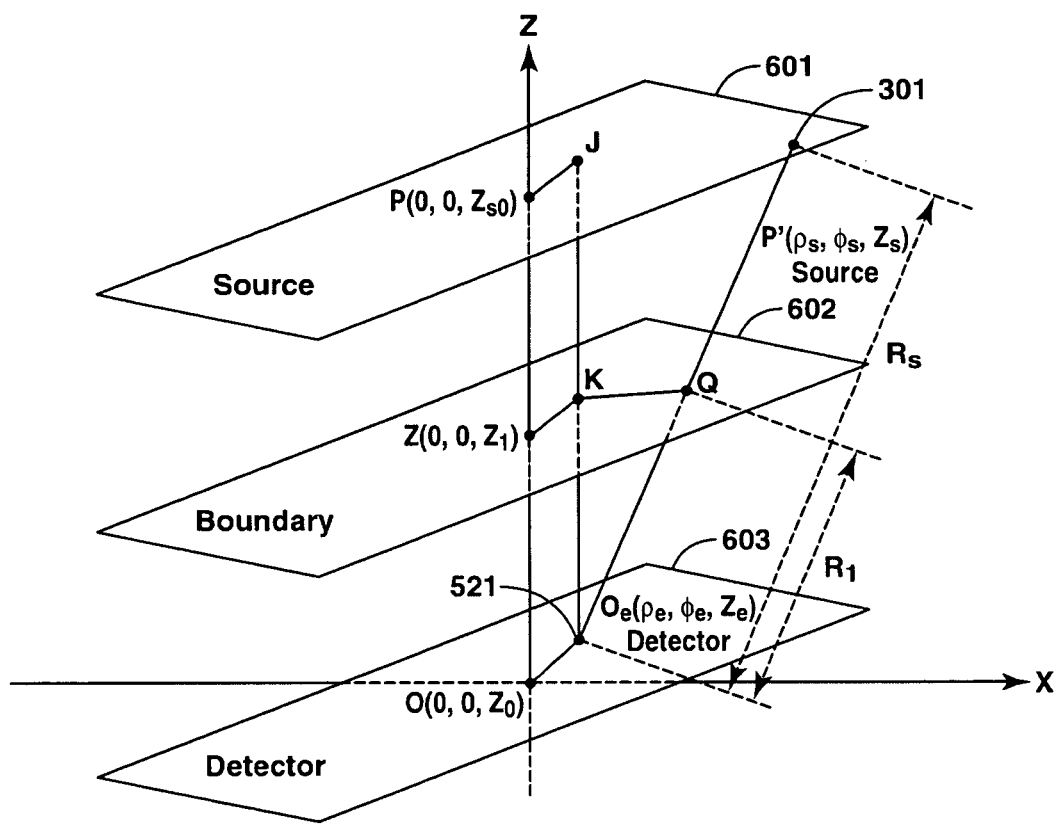

Referring now to FIG. 6, it can be seen that source 301, at point P'($\rho_s,\phi_s,Z_s$), is on plane 601 which is parallel to sediment bed boundary plane 602. Plane 601 intersects the Z axis at point P(0,0,$Z_{S0}$). The sediment bed boundary plane, plane 602, intersects the Z axis at point Z(0,0,$Z_1$). Detector 603, at point $O_e(\rho_e,\phi_e,Z_e)$, is on plane 603, which plane is also parallel to sediment bed boundary plane 602. Plane 603 intersects the Z axis at point O(0,0,$Z_0$). From detector point $O_e$, a line can be drawn parallel to the Z axis and this line will intersect plane 603 (the sediment bed boundary plane) at point K and plane 601 (the source plane) at point J. Where the distances from detector 521 to the layer boundaries are defined as $R_1$ to $R_m$, the following ratio can be derived from the geometric relationships shown in FIG. 6:

$$\frac{Z_1 - Z_0}{Z_{s0} - Z_0} = \frac{R_1}{R_s} \qquad (23)$$

Likewise, $Z_{s0}$ (the point at which plane 601 intersects the Z axis) and $Z_0$ (the point at which plane 603 intersects the Z axis) can be solved as:

$$Z_{s0} = Z_s - \rho_s \cdot \cos \phi_s \cdot tg\theta \qquad (24)$$

$$Z_0 = Z_e - \rho_e \cdot \cos \phi_e \cdot tg\theta \qquad (25)$$

Knowing the source point $P'(\rho_s, \phi_s, Z_s)$, the detector point $O_e(\rho_e, \phi_e, Z_e)$, and the boundary point $Z(0,0,Z_1)$, $R_1$ (the distance along the gamma ray path from the detector point to the boundary plane) can be solved for using equations (23)-(25) above.

Figure 7:
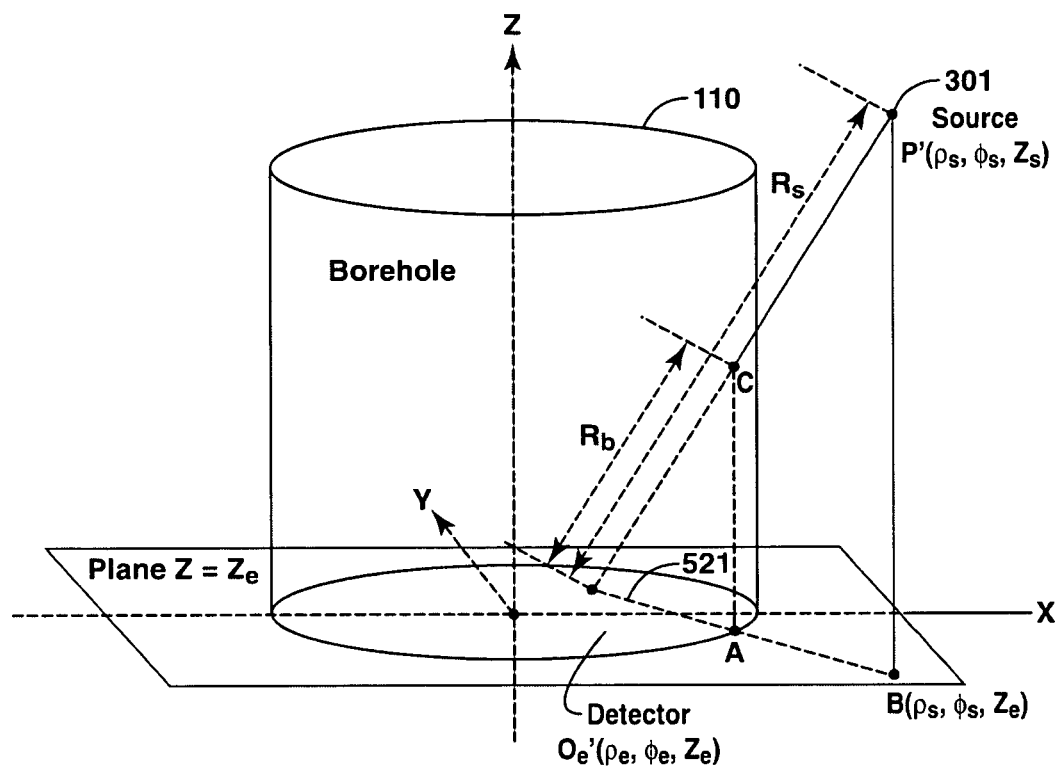
FIGS. 7 and 8 show the geometric relationship of the borehole with respect to the GR detector and unit volume source of FIGS. 5 and 6.

Directing attention to FIG. 7, the geometric relationship of the gamma ray path from the source point, $P'(\rho_s, \phi_s, Z_s)$, to the detector point, $O_e(\rho_e, \phi_e, Z_e)$ is shown with respect to borehole 110. In FIG. 7, line P'B is a line perpendicular to the plane $Z=Z_e$ which intersects the source point, and point $B(\rho_s, \phi_s, Z_e)$ is the intersection point of line P'B and the plane $Z=Z_e$. Point C is the intersection of the gamma ray path from the source point to the detector point (line P'$O_e$) with borehole 110. Point A is the intersection with plane $Z=Z_e$ of a line parallel to line P'B which passes through point C. The following can be derived from the geometric relationships shown in FIG. 7:

$$\frac{O_e A}{O_e B} = \frac{R_{b\_xoy}}{R_{s\_xoy}} = \frac{R_b}{R_s} \qquad (26)$$

From the foregoing it can be appreciated that, if $O_e A$ and $O_e B$ are defined, $R_b$ is also defined.

Figure 8:
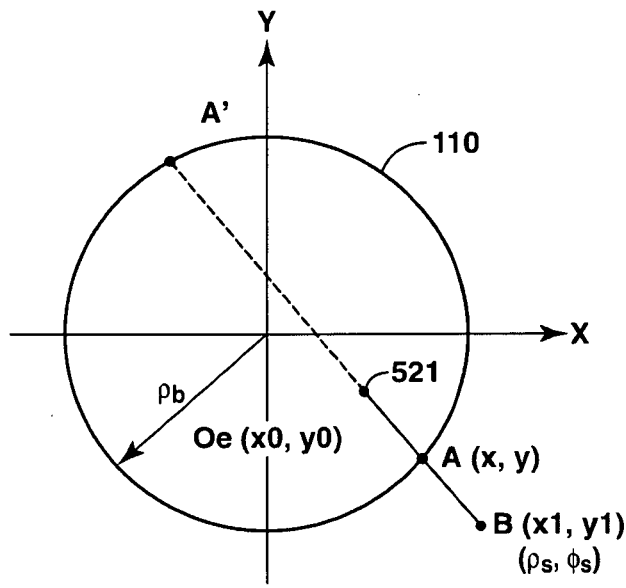

When the geometry in FIG. 7 is projected down to the XOY plane, the geometry of FIG. 8 results. As shown in FIG. 8, the positions of $O_e$ and B are already defined, and the radius of borehole 110, $\rho_b$, is given. The position of A can be derived from a the following line function and circle function:

$$y = y0 + k(x - x0) \qquad (27)$$

$$x^2 + y^2 = \rho_b^2 \qquad (28)$$

where:

$$K = \frac{y1 - y0}{x1 - x0} \qquad (29)$$

Solving equations (27) and (28) simultaneously, two possible solutions for A (A and A', as shown in FIG. 8) result. The following equation can be used to judge which of the solutions to choose for the position of A(x,y), and thus to derive $O_e A$:

$$O_e B = O_e A + AB \qquad (30)$$

Using equations (26)-(30), the distance, $R_b$, along the gamma ray path from point $O_e$ to the borehole wall can be solved for.

It should be appreciated that the distance, $R_c$, along the gamma ray path from point $O_e$ to the outer casing surface can be solved for using the foregoing geometric concepts. Accordingly, well configurations including casing, mud cake, or other media lining the borehole may readily be accommodated according to the concepts of the present invention.

Figure 9:
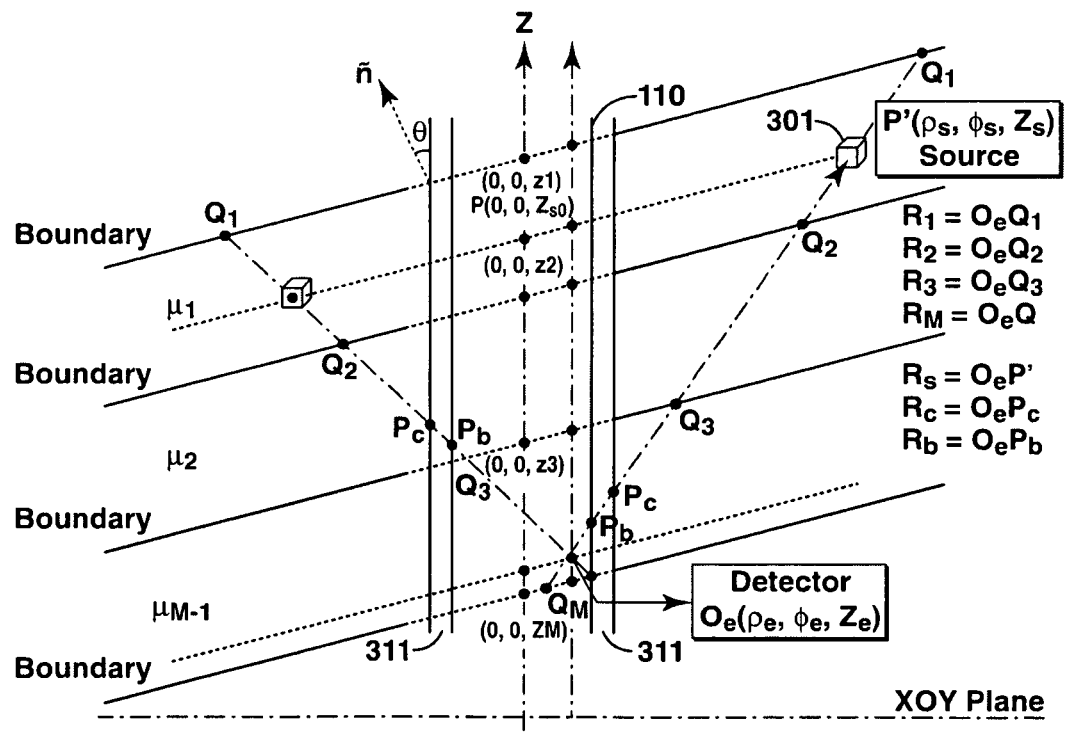
FIG. 9 shows the geometric relationship of a point GR detector, disposed on an eccentric with respect to the borehole, and a unit volume source in a multiple layer formation.

Directing attention to FIG. 9, the geometric relationship of eccentrically disposed point detector 521 and source 301 in a multiple layer formation is shown. Similar to the ratio defined in equation (23) above for a single layer formation, a set of ratios for the multiple layered formation shown in FIG. 9 can be defined as:

$$\frac{Z_1 - Z_0}{Z_{s0} - Z_0} = \frac{R_1}{R_s} \Rightarrow R_1 = \frac{Z_1 - Z_0}{Z_{s0} - Z_0} \cdot R_s \qquad (31)$$

$$\frac{Z_2 - Z_0}{Z_{s0} - Z_0} = \frac{R_2}{R_s} \Rightarrow R_2 = \frac{Z_2 - Z_0}{Z_{s0} - Z_0} \cdot R_s \qquad (32)$$

$$\frac{Z_m - Z_0}{Z_{s0} - Z_0} = \frac{R_m}{R_s} \Rightarrow R_m = \frac{Z_1 - Z_0}{Z_{s0} - Z_0} \cdot R_s \qquad (33)$$

Similar to the relationship of equation (26), the following ratios can be defined for the multiple layer formation case:

$$\frac{R_{b\_xoy}}{R_{s\_xoy}} = \frac{R_b}{R_s} \Rightarrow R_b = \frac{R_{b\_xoy}}{R_{s\_xoy}} \cdot R_s \qquad (34)$$

$$\frac{R_{c\_xoy}}{R_{s\_xoy}} = \frac{R_c}{R_s} \Rightarrow R_c = \frac{R_{c\_xoy}}{R_{s\_xoy}} \cdot R_s \qquad (35)$$

Similar to the centered detector cases set forth above in equation (7), the following gamma ray intensity formulas may be derived using the geometric relationships of FIG. 9:

$$dJ_r = \frac{n_\lambda dv}{4\pi R_s^2} \cdot e^{-\mu_1(R_s - R_2) - \mu_2(R_2 - R_3) - \mu_3(R_3 - R_c) - \mu_c(R_c - R_b) - \mu_b R_b} \qquad (36)$$

$$dJ_\gamma = \frac{n_\lambda dv}{4\pi R_s^2} \cdot e^{-\mu_1(R_s - R_2) - \mu_2(R_2 - R_c) - \mu_c(R_c - R_b) - \mu_b R_b} \qquad (37)$$

It should be appreciated that equations (36) and (37) account for the eccentricity of point detector 521. That is, depending upon the position of point detector 521 within borehole 110 resulting from rotation of detector 521 about the Z axis, either the "short distance" gamma ray intensity equation (36) or the "long distance" gamma ray intensity equation (37) will be appropriate. The appropriate equation may be chosen as discussed above with reference to equation (30).

It should be appreciated that use of equations (36) and (37) facilitate GR tool modeling which includes azimuthal analysis. Accordingly, GR detector response may be tagged in 3D space to include azimuth along the borehole. Such information may be particularly useful in determining sediment bed dip angle, sediment bed thickness, etc.

From the foregoing, the analytical expression for 3D eccentrically disposed GR point detector response in a deviated borehole or formation with dip in a multiple layer formation can thus be derived as:

$$J_\gamma = n_\lambda \cdot \qquad (38)$$

$$\int_{\rho_c}^{\rho_{s\_max}} \int_0^{2\pi} \int_{z1 + \rho_s \cdot \cos\phi_s \cdot tg\theta}^{z2 + \rho_s \cdot \cos\phi_s \cdot tg\theta} \frac{e^{[-\mu_b R_b - R_c(\rho_c - \rho_b) - \mu_1 x_1 - \ldots - \mu_{M-1} x_{M-1}]}}{4\pi R_s^2}$$

$$\cdot \rho_s d\rho_s d\phi_s dZ_s$$

In providing a computationally efficient GR tool simulation technique, embodiments of the present invention discretize the gamma ray source as a plurality of the foregoing unit volume sources. Accordingly, embodiments of the invention utilize a discretization function to determine the gamma particles which would reach a point detector from each such point source without scattering.

Figures 10A, 10B, 10C:
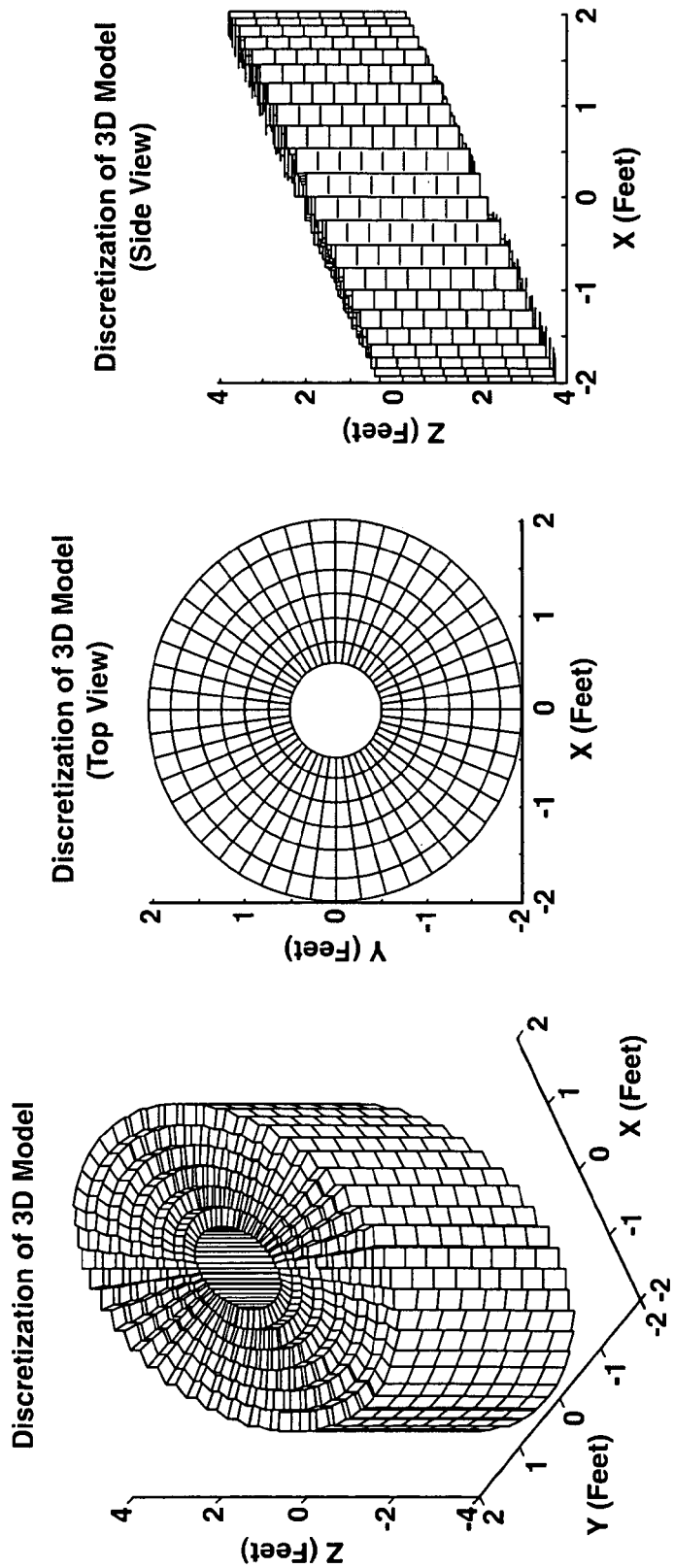
FIGS. 10A-10C show a discretized representation, using a plurality of unit volume sources, of an investigation domain.

FIGS. 10A-10C show a discretized 3D model of borehole 110 and the investigation domain of shale layer 102. Specifically, FIG. 10A shows an isometric view of the discretized model in which a plurality of unit volume sources, such as source 301 discussed above, are utilized to model the investigation domain of shale layer 102. FIGS. 10B and 10C show the top plan view and side elevation view, respectively, of the discretized model of FIG. 10A, wherein the top plan view of FIG. 10B shows that the borehole and formation on the $\rho\phi$ plane are circular. It should be noted that only the radioactive shale sediment bed is shown in FIGS. 10A-10C. The illustrated discretized model provides uniform discretization in cylindrical coordinates. From the isometric view of FIG. 10A, it can be seen that the distance along the Z axis changes with respect to the dip and azimuth angle. From the side elevation view of FIG. 10C, it can be seen that in the illustrated embodiment of the discretized model the formation comprises a summation of discretized cell planes, each of which are parallel to the sediment bed boundary plane.

It should be appreciated that the domain of the integral defining the gamma ray intensity at a point detector, as set forth in equation (38) above, includes the radius of the formation that is defined by the outer radius of the casing to the maximum path length that GR particles can travel (generally 2-3 feet), the azimuth (0 to $2\pi$), and the measured depth (Z) varying with respect to dip and phi, wherein all planes are parallel to the bed boundary. The discretized form of the integral function set forth in equation (38) can be rewritten according to embodiments of the invention as:

$$J_\gamma = n_\lambda \sum_{\rho_c}^{\rho_{s\_max}} \sum_0^{2\pi} \sum_{z1+\rho_s \cdot \cos\phi_s \cdot tg\theta}^{z2+\rho_s \cdot \cos\phi_s \cdot tg\theta} \frac{e^{\left[\begin{array}{c}-\mu_b R_b - R_c(\rho_c-\rho_b)- \\ \mu_1 x_1 - \cdots - \mu_{M-1} x_{M-1}\end{array}\right]}}{4\pi R_s^2} \rho_s \Delta\rho_s \Delta\phi_s \Delta Z_s \quad (39)$$

The foregoing equation may readily be processed by commonly available, and relatively inexpensive, computing equipment, such as personal computers. Accordingly, GR detector response may be efficiently modeled or simulated according to embodiments of the invention without requiring supercomputers or unacceptably long processing times.

Although discretization according to embodiments of the present invention can be performed using a uniform grid in cylindrical coordinates, as shown in FIGS. 10A-10C, the concepts of the present invention are not limited to the use of uniform cells in cylindrical coordinates. Accordingly, embodiments of the invention may utilize any coordinate system which allows for fast computation with sufficient accuracy. According to one embodiment, an exponential varying grid is utilized, wherein fine cells are defined around the detector and coarse cells are defined away from the detector. For instance, one can order:

$$\rho_s \Delta \rho_s \Delta \phi_s \Delta Z_s = e^{[+\mu_b R_b + R_c(\rho_c - \rho_b) + \mu_1 x_1 \cdots +\mu_{M-1} x_{M-1}]}$$
$$\rho_s' \Delta \rho_s' \Delta \phi_s' \Delta Z_s' \quad (40)$$

Using the above, the discretized function of equation (39) may be rewritten as:

$$J_\gamma = n_\lambda \sum_{\rho_c}^{\rho_{s\_max}} \sum_0^{2\pi} \sum_{z1+\rho_s \cdot \cos\phi_s \cdot tg\theta}^{z2+\rho_s \cdot \cos\phi_s \cdot tg\theta} \frac{\rho_s}{4\pi R_s^2} \Delta\rho_s' \Delta\phi_s' \Delta Z_s' \quad (41)$$

Such an embodiment, implementing an exponentially varying grid, will drastically reduce number of cells in the regime of tool sensitivity, and therefore would significantly reduce computing time for fast 3D GR tool response modeling.

As discussed above, the foregoing analytical analysis is based upon a premise wherein only the gamma ray particles without scattering are counted by the modeled GR detector. Accordingly, embodiments of the invention assume that only gamma ray particles from the spatially distributed source of a radioactive formation reaching the GR detector through zero-scattering are counted in the modeled tool response. Analysis has revealed, however, that such an assumption provides a reasonably accurate model of GR detector response.

Figure 11A:
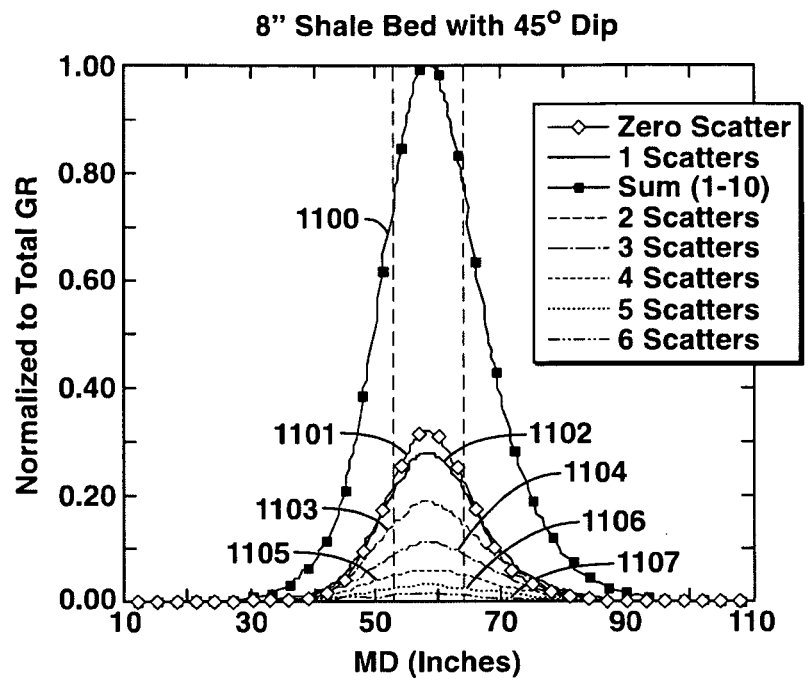
FIGS. 11A and 11B show GR detector response for gamma rays encountering various amounts of scatter, including zero scatter.

Directing attention to FIG. 11A, a graph showing gamma ray counts at a GR detector associated with zero-scatter (line 1101), one-scatter (line 1102), two-scatter (line 1103), three-scatter (line 1104), four-scatter (line 1105), five-scatter (line 1106), and six-scatter (line 1107) as provided by MCNP analysis. It can be appreciated from the diminishing amplitude of the lines as the number of scatters increases that the impact of gamma rays having higher order scattering is negligible. As can be seen in FIG. 11A, gamma rays associated with zero-scatter comprise approximately 32% of the total gamma rays detected, whereas gamma rays associated with one-scatter comprise approximately 27%, gamma rays associated with two-scatter comprise approximately 18%, gamma rays associated with three-scatter comprise approximately 11%, and gamma rays associated with four-scatter comprise approximately 5%.

Figure 11B:
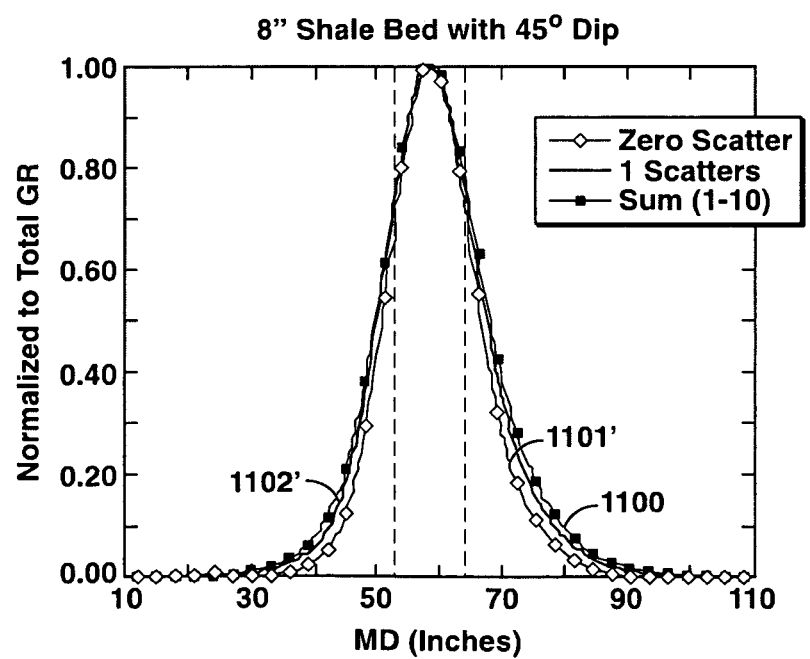

Line 1100 represents the combined gamma ray count of the various scatter numbers shown and normalized by the peak count. In the normalization process the simulated tool response of the illustrated embodiment is scaled linearly by multiplying a constant. The constant is the inverse of the peak count, e.g. the highest count value. Such linear scaling of the tool response does not alter the shape of the response which is in consistent with shale volume calculation. Shale volume, Vsh, calculation is one of the primary applications of gamma ray log. The most widely used Vsh model is the linear scaling model, $$Vsh = \frac{GR - GR_{min}}{GR_{max} - GR_{min}} \quad (42)$$

where $GR_{max}$ and $GR_{min}$ are the maximum and minimum long response values. Although the gamma ray particles reaching the GR detector with zero-scatter comprise less than 50% of the total response, when scaled to Vsh the zero-scatter based GR detector response agrees very well with total scatters based response. FIG. 11B shows that the normalized gamma ray count associated with zero-scatter (line 1101') very closely matches the normalized combined gamma ray count (line 1100), and thus that the aforementioned analytical analysis provides a useful model of GR detector response. This facilitates the use of simplified input parameters according to embodiments of the invention. For example, embodiments of the invention, wherein only gamma ray particles having zero-scatter are counted in the GR detector modeling, may be implemented using simplified input parameters such as attenuation coefficient and GR intensity for just sand and shale (e.g., μ_ss, μ_sh, $n_{\gamma\_ss}$, and $n_{\gamma\_sh}$), instead of more complex input parameters such as μ(i) and GR intensity $n_\gamma(i)$ for each layer (e.g., i=1, 2, 3, . . . n for n-layers).

It should be appreciated that scaled or normalized gamma ray count associated with zero-scatter (e.g., line 1101') may be directly compared to GR logs provided through field measurements. Accordingly, meaningful comparison of such modeled GR tool response to actual GR tool response may easily be made.

FIG. 11B further shows that the normalized gamma ray count associated with one-scatter (line 1102') also very closely matches the normalized combined gamma ray count (line 1100). Accordingly, embodiments of the invention may additionally or alternatively utilize this information. For example, the concepts expressed in equations (1), (7), and (19) can be expanded to include all orders of scatters with different energy bands by different radioactive elements, such as U, Th, and K as:

$$dJ_\gamma(\text{Total}) = \sum_j^{U,Th,K} n_\gamma(j) \sum_i^n \frac{e^{-\mu(i)R}}{4\pi R^2} dv \qquad (43)$$

where j=U, Th, K, or any other radioactive element, and i=0, 1, 2, 3, . . . $n_{th}$ scattering. The foregoing embodiment is appreciably more complicated than the embodiments described above wherein only gamma rays with zero-scatter are used, and thus is likely to require additional computing time and resources. Accordingly, where embodiments using gamma ray counts for zero-scatter only provide sufficient accuracy, such embodiments may be preferred for fast computation times and less utilization of resources.

The foregoing analytical analysis has been described with respect to a point GR detector. However, GR detectors implemented by typical GR tools have dimension and volume (e.g., line detectors or volume detectors). For example, a common NaI crystal as a GR detector has dimension of 12 inches in length and 2 inches in diameter. Accordingly, embodiments of the present invention further utilize the foregoing analytical analysis to provide discretization functions with respect to a plurality of point detectors, wherein the particular number and configuration of point detectors are selected to relatively accurately simulate the results of a particular GR detector configuration.

Figure 12:
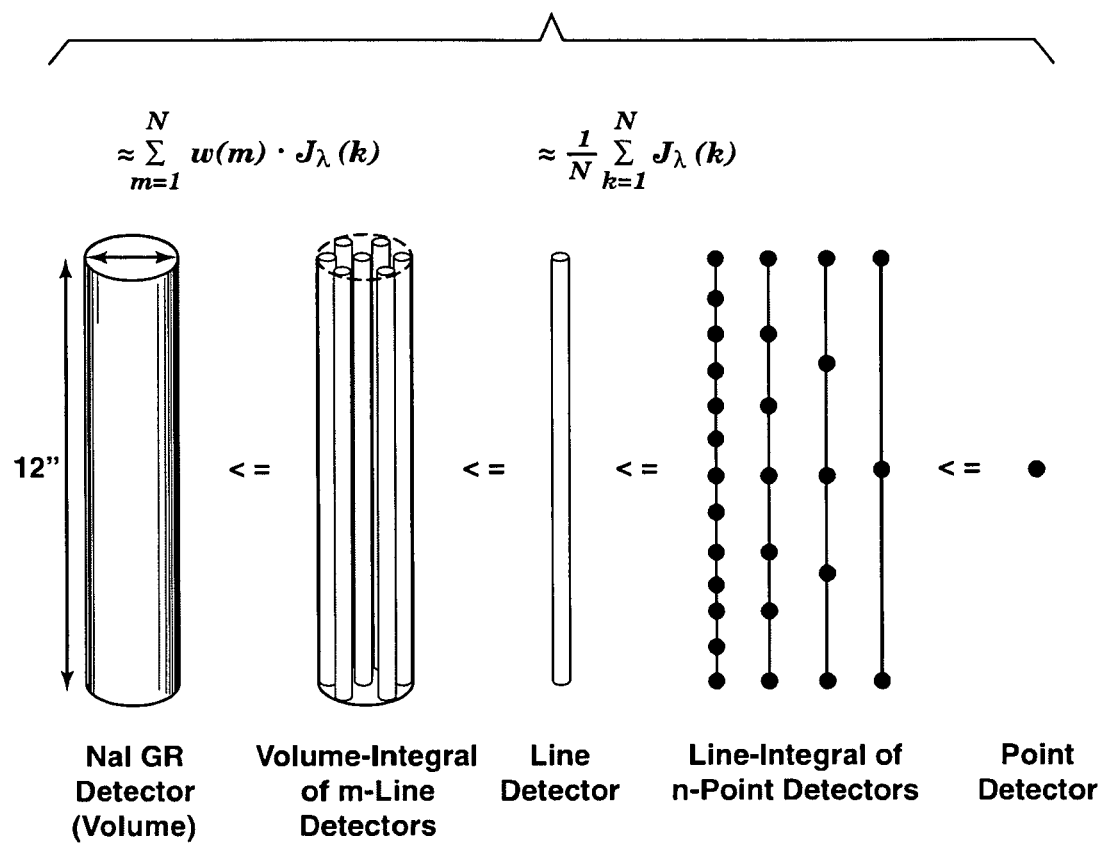
FIG. 12 shows modeling a line detector response by summing the response of a plurality of point detectors and modeling a volume detector by summing the response of a plurality of line detectors.

In order to understand the differences resulting from the use of point detectors in modeling GR detectors having dimension and volume, a series tests were conducted to quantify the changes from point, to line, to volume detectors. FIG. 12 illustrates the concept of modeling a line detector response by summing the response of a plurality of point detectors disposed in a line along the borehole direction that is equivalent to the line integral. FIG. 12 further illustrates the concept of modeling a volume detector response by summing the response of a plurality of line detectors disposed within the volume of the volume detector space that is equivalent to the volume integral.

Analysis was conducted to determine a number of point detectors, evenly distributed along a line the length of a line detector, that adequately model the line detector response. In the case of a 12 inch line detector, detector responses for lines of 3 point detectors, 5 point detectors, 7 point detectors, and 13 point detectors were analyzed. The detector responses were normalized with the 13 point detector responses and compared for a determination of the effect of using fewer point detectors to model the line detector. The comparison revealed that there is negligible difference between the 5 point detector, 7 point detector, and 13 point detector line detector modeling responses. It should be appreciated that the foregoing analysis may be used to determine an optimum number of point detectors for different lengths of GR detectors.

Accordingly, when modeling a GR detector 12 inches in length, embodiments of the present invention utilize the foregoing discretization function for a series of 5 point detectors evenly distributed along a 12 inch line parallel to the borehole. Of course, fewer or more point detectors may be used in modeling GR tool response, such as where less accuracy is desired or more computing resources are available, if desired. The foregoing 5 point detector configuration is particularly desirable because it results in point detector response per 0.25 ft, which is the nominal GR logging sampling rate used today. After the first five points response is calculated, e.g., using equations (39) or (41), a box filter method may be used to combine the five points to obtain the response at the measured depth (the center point detector, or point detector 3), for the next measurement point with tool moving 0.25 ft downward (or upward, if logging up) only one point detector response (the bottom point detector, or point detector 1) is needed to combine with the previously calculated four point detector responses (the upper 4 point detectors, or point detectors 2, 3, 4, and 5) to obtain the response. This facilitates significantly reduced computations for fast and efficient GR tool simulation.

Figure 13B:
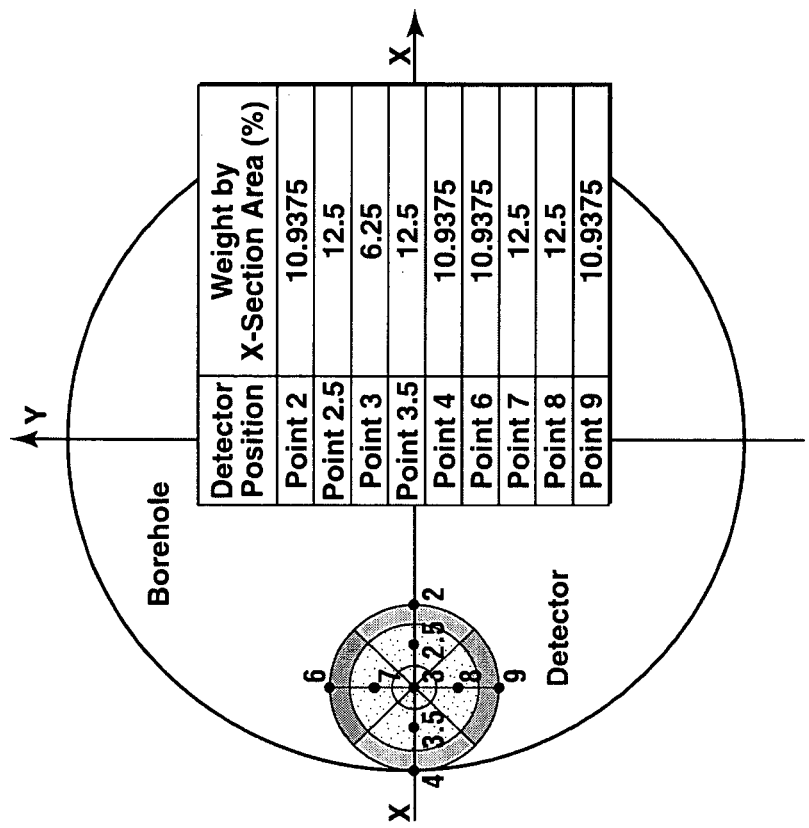
FIGS. 13A and 13B show a plurality of line detectors disposed in a volume to model a volume detector.
Figure 13A:
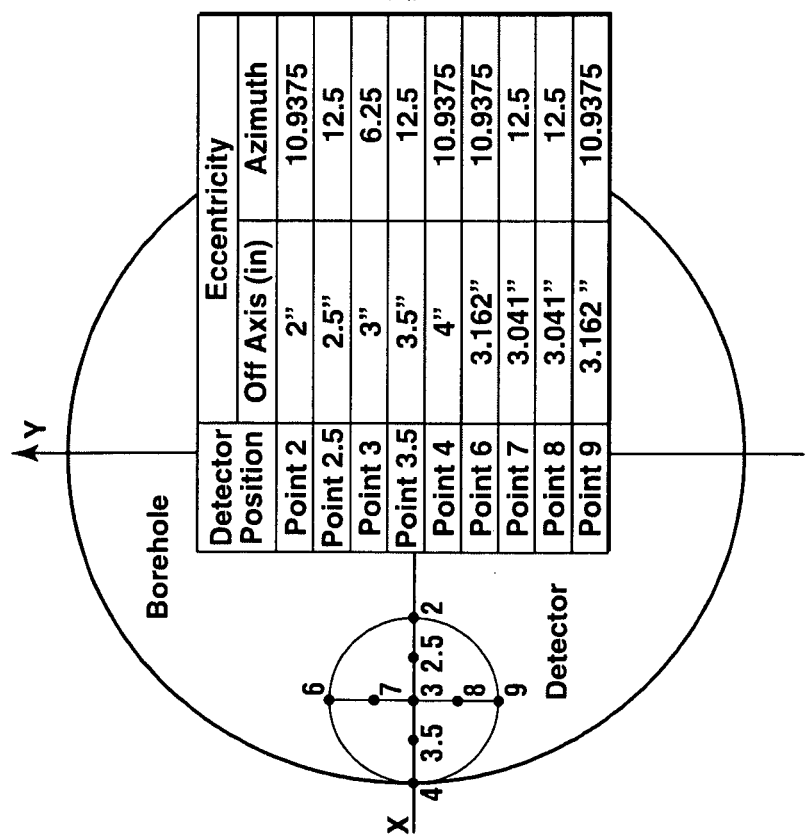

The foregoing shows how a line detector may adequately be represented by a plurality of point detectors. However, as previously mentioned, many GR tools utilize a volume GR detector. Accordingly, further analysis was conducted to determine the gamma ray response difference between a true volume detector and a plurality of line detectors disposed in the volume of the volume detector. As shown in FIG. 13A, a volume of a volume detector was simulated using 9 line detectors disposed in that same volume. As shown in FIG. 13B, the line detectors were assigned cross sectional area as weights for their contribution to the simulated volume detector. That is, the 9 line detectors are sectioned by the area of their position and weights are calculated from the associated areas over the cross-sectional area of the volume detector (e.g., for 2" by 12" NaI detector, $\pi(D/2)^2 = 3.14 \times (2/2)^2 = 3.14$ inch-squared). It should be appreciated that FIGS. 13A and 13B illustrate the case were a GR detector is disposed on an eccentric, such as the case of a LWD GR tool configuration.

Normalized MCNP simulation GR intensity results were calculated, to see the shape and the relative shift from the bed boundary relative to the borehole axis, for the foregoing line detectors from the eccentric position 2 inches, 2.5 inches, 3 inches, 3.5 inches, and 4 inches associated with the simulated volume detector disposed at azimuth 180° in a 45° well and traversing through an 8" thick shale. The normalized amplitudes were compared with the normalized response of a line detector disposed at the 3 inch off-centered position (the center line detector of FIGS. 13A and 13B). It was found that there is negligible difference in GR intensity between the line detectors used in simulating a volume detector, which differences were even smaller when the responses were normalized. Accordingly, embodiments of the invention model a volume detector using a single line detector disposed in the axis of the volume detector (i.e., the line detector shown at the 3 inch eccentric, center position in FIG. 13A. As shown above, a line detector may be modeled using an appropriate number of point detectors disposed along a line corresponding to the line detector. Accordingly, embodiments of the invention model a volume detector using a plurality of point detectors (e.g., 5 point detectors) disposed along a line corresponding to the longitudinal axis of the volume detector being modeled.

As can be appreciated from the foregoing, GR tool response modeling provided according to embodiments of the invention facilitates a practical and relatively fast simulation, such as may be used as an aid in GR log interpretation. Experimentation has revealed that GR tool simulation provided according to embodiments of the present invention closely match modeling of the same formation using MCNP algorithms. Such MCNP based simulation techniques are widely accepted as accurately modeling GR tool response, thereby showing that the foregoing hybrid modeling solution may be relied upon to provide useful modeling of GR tool response. Use of techniques of the present invention, however, may be performed at computing speeds over 1000 times faster than those associated with MCNP based simulation techniques. Thus, embodiments may be implemented using inexpensive and widely available computing platforms, such as personal computers, thereby facilitating economic and practical GR tool simulation.

When implemented in software, elements of the present invention are essentially code segments to perform the aforementioned operations. The program or code segments can be stored in a computer readable medium or transmitted by a computer data signal embodied in a carrier wave, or a signal modulated by a carrier, over a transmission medium. The computer readable medium may include any medium that can store information, such as may comprise an electronic circuit, a semiconductor memory device, a read only memory (ROM), a flash memory, an erasable ROM (EROM), programmable ROM (PROM), a floppy diskette, a compact disk read only memory (CD-ROM), an optical disk, a hard disk, etc. The code segments may be downloaded via computer networks such as the Internet, an intranet, a local area network (LAN), a wide area network (WAN), a wireless network, the public switched telephone network (PSTN), a cable transmission network, etc.

Figure 14:
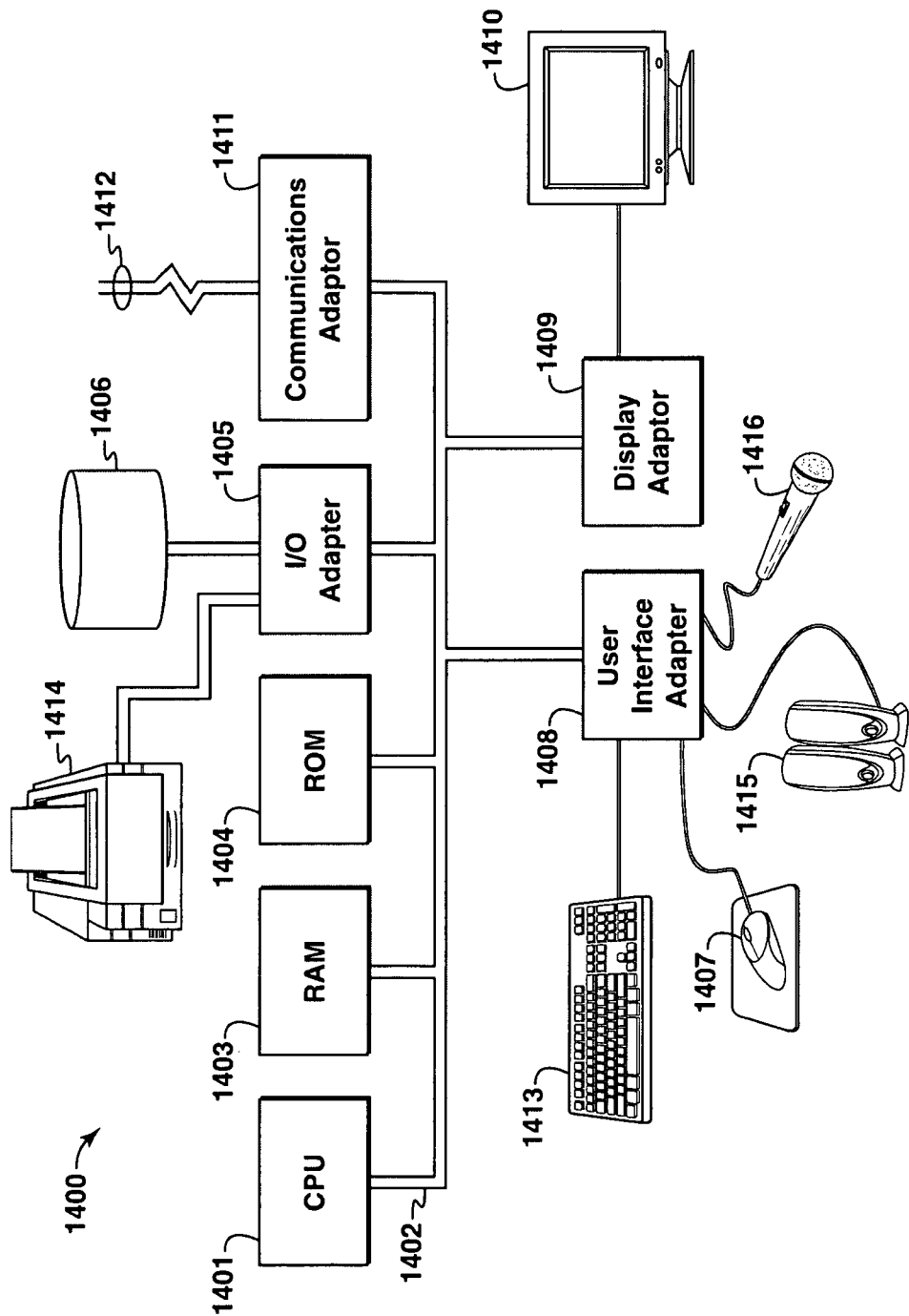
FIG. 14 shows a computer system adapted to provide modeling according to an embodiment of the invention.

FIG. 14 illustrates computer system 1400 adapted to implement embodiments of the present invention. In the illustrated embodiment of computer system 1400, central processing unit (CPU) 1401 is coupled to system bus 1402. CPU 1401 may be any general purpose CPU, such as a PENTIUM processor, a POWERPC processor, etc. However, the present invention is not restricted by the architecture of CPU 1401 as long as CPU 1401 supports the inventive operations as described herein. Bus 1402 is coupled to random access memory (RAM) 1403, which may comprise SRAM, DRAM, SDRAM, etc. ROM 1404, such as may comprise PROM, EPROM, electrically erasable PROM (EEPROM), etc., is also coupled to bus 1402 in the illustrated embodiment. RAM 1403 and ROM 1404 hold user and system data and programs as is well known in the art.

Bus 1402 is also coupled to input/output (I/O) controller 1405, communications adapter 1411, user interface adaptor 1408, and display adaptor 1409. I/O adapter 1405 connects storage devices 1406, such as may comprise one or more of a hard drive, a CD drive, a floppy disk drive, a tape drive, etc., to the computer system. I/O adapter 1405 of the illustrated embodiment is also connected to printer 1414, which allows the computer system to print paper copies of information such as document, photographs, articles, etc. Note that the printer may be a printer (e.g. dot matrix, laser, etc.), a fax machine, a copier machine, etc. Communications adaptor 1411 is adapted to couple computer system 1400 to a network 1412, which may comprise one or more of the PSTN, a LAN, a WAN, the Internet, an intranet, an extranet, etc. User interface adaptor 1408 couples user input devices, such as keyboard 1413, pointing device 1407, and microphone 1416, to computer system 1400. User interface adaptor 1408 also provides sound output to a user via speaker(s) 1415. The display card 1409 is driven by CPU 1401 to control the display on display device 1410.

The foregoing components of computer system 1400, operating under control of code segments defining operation as described herein, may be used to provide GR tool simulation of embodiments of the present invention. Such embodiments may thus be implemented using inexpensive and widely available computing platforms, such as personal computers, thereby facilitating economic and practical GR tool simulation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method comprising:
representing an investigation domain using a plurality of discrete radiation source volumes, the investigation domain comprising at least one layer of a geological structure and each radiation source volume being characterized by a constant number of gamma emissions per second per unit volume;
modeling a gamma ray (GR) tool response by computer simulating an intensity of gamma ray particles emitted by each radiation source volume of the plurality of discrete radiation source volumes which would impinge upon a point GR detector without scattering in the propagation path between an emitting one of the radiation source volumes and the point GR detector, the gamma ray particles impinging upon the point GR detector without scattering being zero-scatter gamma ray particles,
wherein the modeled gamma ray intensity is a sum of contributions from all discrete radiation source volumes that make up at least one layer of the investigative domain, and
wherein said modeling a gamma ray tool response comprises beginning with an expression for intensity dJ of unscattered gamma rays of a selected energy at a point detector emitted from a radiation source volume dv, in which expression the intensity falls off as the inverse square of the distance between dv and the detector and also decays exponentially with distance due to absorption attenuation of gamma rays along a path between dv and the detector, then summing the expression for dJ over all source volumes making up at least one layer; and wherein, in said modeling, input quantities include spatial location of the detector, which is known, and model parameters including one or more medium-dependent constants representing absorption of gamma rays per unit distance, one or more medium-dependent constants representing number of gamma emissions per second per unit volume, and structure information in the form of location values defining layer boundaries, where the model parameters are unknown and are represented by assumed values in the simulation; and using the modeled gamma ray tool response to interpret actual gamma ray logs measured by the GR tool being modeled for information regarding media and structure of the investigative domain.

2. The method of claim 1, wherein the plurality of discrete radiation source volumes are each a same volume.

3. The method of claim 1, wherein the plurality of discrete radiation source volumes comprise smaller volumes in areas near the GR detector and larger volumes at an outer edge of the investigation domain.

4. The method of claim 3, wherein the plurality of discrete radiation source volumes comprise an exponentially varying grid of radiation source volumes.

5. The method of claim 1, wherein the plurality of discrete radiation source volumes are disposed in at least one plane paralleling a boundary plane of the at least one layer of the geological structure.

6. The method of claim 1, wherein the modeling the GR tool response comprises:

representing a GR detector of the GR tool as a plurality of point GR detectors, the point GR detector being one of the plurality of point GR detectors.

7. The method of claim 6, wherein the plurality of point GR detectors are arranged to be on an eccentric with respect to a borehole center.

8. The method of claim 6, wherein the modeling the GR tool response comprises:

determining an intensity of zero-scatter gamma ray particles emitted by each radiation source volume of the plurality of discrete radiation source volumes which would impinge upon each point GR detector of the plurality of point GR detectors.

9. The method of claim 6, wherein the GR detector comprises a line detector and the plurality of point GR detectors comprise a plurality of point detectors arranged to be evenly spaced along a line of a length of the line detector.

10. The method of claim 6, wherein the GR detector comprises a volume detector and the plurality of point GR detectors comprise a plurality of point detectors arranged to be evenly spaced along a line of a length of the volume detector.

11. The method of claim 10, wherein the plurality of point GR detectors comprise a single line of the point detectors.

12. The method of claim 1, wherein the determining an intensity of gamma ray particles which would impinge upon the point GR detector without scattering comprises: applying a discretization function with respect to the plurality of discrete radiation source volumes and the point GR detector.

13. The method of claim 1, wherein the modeling a GR tool response is performed:

for a plurality of borehole azimuth angles.

14. The method of claim 13, wherein when the actual gamma ray logs were measured, the GR tool was positioned within a borehole within a subsurface formation containing the geological structure.

15. The method of claim 14, further comprising:

based on the modeled GR tool response, determining structural characteristics of the geological structure; and analyzing the determined structural characteristics of the geological structure to determine a hydrocarbon production plan; and producing hydrocarbons from the subsurface formation based on the hydrocarbon production plan.

16. The method of claim 1, wherein the modeling a gamma ray tool response comprises scaling or normalizing the modeled response to compensate for ignoring scattered gamma rays in the modeling.

17. The method of claim 16, wherein the scaling or normalizing is based on a relationship between shale volume and gamma ray count rate.

18. The method of claim 1, wherein the geological structure comprises media that contain natural sources of gamma ray energy, and each discrete radiation source volume in the at least one layer is characterized by the same constant number of gamma emissions per second per unit volume.

19. The method of claim 1, wherein the GR tool comprises at least one gamma ray detector, configured in a wireline tool configuration or included in a drill string as a logging-while-drilling tool, to be lowered into a borehole to measure natural sources of gamma radiation in the geological structure surrounding the borehole.

20. A method comprising:

representing an area of geologic investigation as a plurality of radiation source volumes, the area of geologic investigation comprising at least one layer of a geological structure and each radiation source volume being characterized by a constant number of gamma emissions per second per unit volume;

representing a GR detector of a GR tool as a plurality of point GR detectors;

computer simulating an intensity of gamma ray particles emitted by each radiation source volume of the plurality of discrete radiation source volumes which would impinge upon each point GR detector of the plurality of point GR detectors, wherein the simulated gamma ray intensity is a sum of contributions from all radiation source volumes that make up at least one layer of the investigative domain, and wherein the simulated gamma ray intensity comprises beginning with an expression for intensity dJ of gamma rays of a selected energy at a point detector emitted from a radiation source volume dv, in which expression the intensity falls off as the inverse square of the distance between dv and the detector and also decays exponentially with distance due to absorption attenuation of gamma rays along a path between dv and the detector, then summing the expression for dJ over all point GR detectors of the plurality of point GR detectors and all source volumes making up at least one layer; and wherein, in said modeling, input quantities include spatial location of each detector, which is known, and model parameters including one or more medium-dependent constants representing absorption of gamma rays per unit distance, one or more medium-dependent constants representing number of gamma emissions per second per unit volume, and structure information in the form of location values defining layer boundaries, where the model parameters are unknown and are represented by assumed values in the simulation; and using the modeled gamma ray tool response to interpret actual gamma ray logs measured by the GR tool for information regarding media and structure of the investigative domain.

21. The method of claim 20, wherein the plurality of discrete radiation source volumes are each a same size volume.

22. The method of claim 20, wherein the plurality of discrete radiation source volumes comprise different size volumes.

23. The method of claim 20, wherein the plurality of radiation source volumes are disposed in at least one plane paralleling a boundary plane of the at least one layer of the geological structure.

24. The method of claim 20, wherein the determining an intensity of gamma ray particles comprises:

counting only zero-scatter gamma ray particles emitted by each radiation source volume of the plurality of discrete radiation source volumes which would impinge upon each point GR detector of the plurality of point GR detectors.

25. The method of claim 20, wherein the GR detector comprises a line detector and the plurality of point GR detectors comprise a plurality of point detectors arranged to be evenly spaced along a line of a length of the line detector.

26. The method of claim 20, wherein the GR detector comprises a volume detector and the plurality of point GR detectors comprise a plurality of point detectors arranged to be evenly spaced along a single line of a length of the volume detector.

27. A computer program product having computer executable code stored on a non-transitory computer readable medium, the computer program product comprising:

computer executable code for representing an investigation domain as a plurality of radiation source volumes, the investigation domain comprising at least one layer of a geological structure and each radiation source volume being characterized by a constant number of gamma emissions per second per unit volume;

computer executable code for modeling a gamma ray (GR) tool response by simulating an intensity of gamma ray particles emitted by each radiation source volume of the plurality of radiation source volumes which would impinge upon a point GR detector without scattering in the propagation path between an emitting one of the radiation source volumes and the point GR detector, wherein the simulated gamma ray count is a sum of contributions from all radiation source volumes that make up at least one layer of the investigation domain, and wherein said modeling a gamma ray tool response comprises beginning with an expression for intensity dJ of unscattered gamma rays of a selected energy at a point detector emitted from a radiation source volume dv, in which expression the intensity falls off as the inverse square of the distance between dv and the detector and also decays exponentially with distance due to absorption attenuation of gamma rays along a path between dv and the detector, then summing the expression for dJ over all source volumes making up at least one layer; and wherein, in said modeling, input quantities include spatial location of the detector, which is known, and model parameters including one or more medium-dependent constants representing absorption of gamma rays per unit distance, one or more medium-dependent constants representing number of gamma emissions per second per unit volume, and structure information in the form of location values defining layer boundaries, where the model parameters are unknown and are represented by assumed values in the simulation; and computer executable code for using the modeled gamma ray tool response to interpret actual gamma ray logs measured by the GR tool being modeled for information regarding media and structure of the investigative domain.

28. The computer program product of claim 27, wherein the computer executable code for modeling the GR tool response comprises:

computer executable code for representing a GR detector of the GR tool as a plurality of point GR detectors, the point GR detector being one of the plurality of point GR detectors.

* * * * *